United States Patent
Minami

(10) Patent No.: US 10,989,291 B2
(45) Date of Patent: Apr. 27, 2021

(54) TRANSMISSION, AND CONTROL SYSTEM FOR WORK VEHICLE

(71) Applicant: KOMATSU LTD., Tokyo (JP)

(72) Inventor: Takanobu Minami, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 16/626,034

(22) PCT Filed: Jan. 21, 2019

(86) PCT No.: PCT/JP2019/001650
§ 371 (c)(1),
(2) Date: Dec. 23, 2019

(87) PCT Pub. No.: WO2019/163357
PCT Pub. Date: Aug. 29, 2019

(65) Prior Publication Data
US 2020/0132179 A1 Apr. 30, 2020

(30) Foreign Application Priority Data

Feb. 22, 2018 (JP) .............................. JP2018-029379

(51) Int. Cl.
*F16H 45/00* (2006.01)
*F16H 47/08* (2006.01)
(Continued)

(52) U.S. Cl.
CPC .............. *F16H 47/08* (2013.01); *B60K 17/10* (2013.01); *F16H 3/72* (2013.01); *F16H 45/00* (2013.01);
(Continued)

(58) Field of Classification Search
CPC . F16H 47/08; F16H 3/72; F16H 45/00; F16H 39/04; F16H 2037/0873;
(Continued)

(56) References Cited

U.S. PATENT DOCUMENTS 3,897,697 A  8/1975 Chambers et al.
5,193,416 A  3/1993 Kanayama
(Continued)

FOREIGN PATENT DOCUMENTS

JP  46-25208 B  7/1971
JP  50-108453 A  8/1975
(Continued)

OTHER PUBLICATIONS

The International Search Report for the corresponding international application no. PCT/JP2019/001650, dated Apr. 9, 2019.

*Primary Examiner* — Justin Holmes
(74) *Attorney, Agent, or Firm* — Global IP Counselors, LLP

(57) ABSTRACT

A second element fixing clutch is switchable between a released state and an engaged state. In the released state, the second element fixing clutch releases a second element of a planetary gear mechanism so that the second element is rotatable. In the engaged state, the second element fixing clutch fixes the second element of the planetary gear mechanism so that the second element is non-rotatable. A transmission is switchable between at least two modes of a first continuously variable transmission mode, a second continuously variable transmission mode, and a direct mode, by the second element fixing clutch being switched between the released state and the engaged state.

22 Claims, 19 Drawing Sheets

(51) Int. Cl.
*B60K 17/10* (2006.01)
*F16H 3/72* (2006.01)
*B60K 6/365* (2007.10)
*B60K 6/442* (2007.10)
*B60K 6/543* (2007.10)
*E02F 3/28* (2006.01)
*E02F 9/20* (2006.01)
*E02F 9/22* (2006.01)
*F16H 39/04* (2006.01)

(52) U.S. Cl.
CPC .............. *B60K 6/365* (2013.01); *B60K 6/442* (2013.01); *B60K 6/543* (2013.01); *B60Y 2200/415* (2013.01); *B60Y 2400/72* (2013.01); *E02F 3/283* (2013.01); *E02F 9/202* (2013.01); *E02F 9/22* (2013.01); *F16H 39/04* (2013.01)

(58) Field of Classification Search
CPC .. F16H 2037/0886; F16H 47/04; F16H 59/40; B60K 17/10; B60K 6/365; B60K 6/442; B60K 6/543; B60K 6/547; B60K 2006/381; B60K 6/445; B60K 6/387; B60K 17/08; B60Y 2200/415; B60Y 2400/72; E02F 3/283; E02F 9/202; E02F 9/22; E02F 9/2079; E02F 9/2253; B60W 2300/17

See application file for complete search history.

(56) References Cited

U.S. PATENT DOCUMENTS

| | | | | |
|---|---|---|---|---|
| 5,976,046 | A | * 11/1999 | Larkin | .................... F16H 47/04 475/72 |
| 6,616,559 | B1 | 9/2003 | Hori et al. | |
| 2006/0247086 | A1 | * 11/2006 | Watanabe | .............. B60K 6/387 475/208 |
| 2016/0047449 | A1 | 2/2016 | Vasudeva et al. | |
| 2017/0043759 | A1 | * 2/2017 | Shibata | ................. B60W 20/10 |
| 2017/0328453 | A1 | 11/2017 | McKinzie et al. | |

FOREIGN PATENT DOCUMENTS

| | | |
|---|---|---|
| JP | 2-195062 A | 8/1990 |
| JP | 11-30306 A | 2/1999 |
| JP | 2000-130556 A | 5/2000 |
| JP | 2014-214829 A | 11/2014 |

* cited by examiner

| | CL1 |
|---|---|
| SECOND CONTINUOUSLY VARIABLE TRANSMISSION | RELEASED |
| DIRECT | ENGAGED |

| | CL1 | CL2 | CL3 |
|---|---|---|---|
| FIRST CONTINUOUSLY VARIABLE TRANSMISSION | RELEASED | RELEASED | ENGAGED |
| SECOND CONTINUOUSLY VARIABLE TRANSMISSION | RELEASED | ENGAGED | RELEASED |
| DIRECT | ENGAGED | ENGAGED | RELEASED |

| | CL1 | CL2 | CL4 |
|---|---|---|---|
| FIRST CONTINUOUSLY VARIABLE TRANSMISSION | RELEASED | RELEASED | ENGAGED |
| SECOND CONTINUOUSLY VARIABLE TRANSMISSION | RELEASED | ENGAGED | RELEASED |
| DIRECT | ENGAGED | ENGAGED | RELEASED |

| | CL1 | CL2 | CL5 |
|---|---|---|---|
| FIRST CONTINUOUSLY VARIABLE TRANSMISSION | RELEASED | RELEASED | ENGAGED |
| SECOND CONTINUOUSLY VARIABLE TRANSMISSION | RELEASED | ENGAGED | RELEASED |
| DIRECT | ENGAGED | ENGAGED | RELEASED |

| | CL4 |
|---|---|
| SECOND CONTINUOUSLY VARIABLE TRANSMISSION | RELEASED |
| DIRECT | ENGAGED |

| | CL4 | CL2 |
|---|---|---|
| FIRST CONTINUOUSLY VARIABLE TRANSMISSION | ENGAGED | RELEASED |
| SECOND CONTINUOUSLY VARIABLE TRANSMISSION | RELEASED | ENGAGED |
| DIRECT | ENGAGED | ENGAGED |

| | CL4 | CL2 | CL3 |
|---|---|---|---|
| FIRST CONTINUOUSLY VARIABLE TRANSMISSION | RELEASED | RELEASED | ENGAGED |
| FIRST CONTINUOUSLY VARIABLE TRANSMISSION | ENGAGED | RELEASED | RELEASED |
| SECOND CONTINUOUSLY VARIABLE TRANSMISSION | RELEASED | ENGAGED | RELEASED |
| DIRECT | ENGAGED | ENGAGED | RELEASED |

| | CL4 | CL2 | CL5 |
|---|---|---|---|
| FIRST CONTINUOUSLY VARIABLE TRANSMISSION | RELEASED | RELEASED | ENGAGED |
| FIRST CONTINUOUSLY VARIABLE TRANSMISSION | ENGAGED | RELEASED | RELEASED |
| SECOND CONTINUOUSLY VARIABLE TRANSMISSION | RELEASED | ENGAGED | RELEASED |
| DIRECT | ENGAGED | ENGAGED | RELEASED |

| | CL2 | CL3 |
|---|---|---|
| FIRST CONTINUOUSLY VARIABLE TRANSMISSION | RELEASED | ENGAGED |
| SECOND CONTINUOUSLY VARIABLE TRANSMISSION | ENGAGED | RELEASED |

| | CL2 | CL4 |
|---|---|---|
| FIRST CONTINUOUSLY VARIABLE TRANSMISSION | RELEASED | ENGAGED |
| SECOND CONTINUOUSLY VARIABLE TRANSMISSION | ENGAGED | RELEASED |

| | CL2 | CL5 |
|---|---|---|
| FIRST CONTINUOUSLY VARIABLE TRANSMISSION | RELEASED | ENGAGED |
| SECOND CONTINUOUSLY VARIABLE TRANSMISSION | ENGAGED | RELEASED |

| | CL2 | CL3 | CL6 |
|---|---|---|---|
| FIRST CONTINUOUSLY VARIABLE TRANSMISSION | RELEASED | ENGAGED | RELEASED |
| SECOND CONTINUOUSLY VARIABLE TRANSMISSION | ENGAGED | RELEASED | RELEASED |
| DIRECT | – | RELEASED | ENGAGED |
| DIRECT | RELEASED | – | ENGAGED |

|  | CL2 | CL4 | CL6 |
|---|---|---|---|
| FIRST CONTINUOUSLY VARIABLE TRANSMISSION | RELEASED | ENGAGED | RELEASED |
| SECOND CONTINUOUSLY VARIABLE TRANSMISSION | ENGAGED | RELEASED | RELEASED |
| DIRECT | — | RELEASED | ENGAGED |
| DIRECT | RELEASED | — | ENGAGED |

| | CL2 | CL5 | CL6 |
|---|---|---|---|
| FIRST CONTINUOUSLY VARIABLE TRANSMISSION | RELEASED | ENGAGED | RELEASED |
| SECOND CONTINUOUSLY VARIABLE TRANSMISSION | ENGAGED | RELEASED | RELEASED |
| DIRECT | – | RELEASED | ENGAGED |
| DIRECT | RELEASED | – | ENGAGED |

TRANSMISSION, AND CONTROL SYSTEM FOR WORK VEHICLE

CROSS-REFERENCE TO RELATED APPLICATIONS

This application is a U.S. National stage application of International Application No. PCT/JP2019/001650, filed on Jan. 21, 2019. This U.S. National stage application claims priority under 35 U.S.C. § 119(a) to Japanese Patent Application No. 2018-029379, filed in Japan on Feb. 22, 2018, the entire contents of which are hereby incorporated herein by reference.

BACKGROUND

Field of the Invention

The present invention relates to a transmission, and a control system for a work vehicle.

Background Information

A hydrostatic transmission (HST) is one of the transmissions. The HST includes a hydraulic pump and a hydraulic motor. The hydraulic pump is driven by an engine to discharge hydraulic fluid. The hydraulic motor is driven by the hydraulic fluid from the hydraulic pump. In the HST, a reduction ratio can be continuously varied by controlling a displacement of the hydraulic pump and a displacement of the hydraulic motor.

Because the HST is a continuously variable transmission, there is little concern of drop of material by a shift shock, and high efficiency can be expected in a low speed range. However, in a high speed range, the hydraulic motor operates at high speed to use more engine outputs. This causes a reduction in efficiency.

Therefore, in recent years, a transmission in which an HST and a mechanical transmission are combined is known. For example, in the transmission described in Japanese Patent Application Laid-Open No. 2014-214829, the HST is used in a low speed range and a direct transmission by a mechanical transmission is used in a high speed range. As a result, the efficiency in the high speed range can be improved.

In the transmission described in US Patent Publication No. US2017/0328453, a hydraulic mechanical transmission (HMT) and a mechanical transmission are switched between each other. Alternatively, instead of the HST, an electromechanical transmission (EMT) using a continuously variable transmission including a generator and an electric motor is also known.

SUMMARY

In the transmission, switching between a first continuously variable transmission mode using the HST and a direct mode using the mechanical transmission is performed. Alternatively, switching between a second continuously variable transmission mode using the HMT and the direct mode is performed. Therefore, a transmission capable of easy and smooth switching between a plurality of modes is desired.

A transmission according to a first aspect includes a first rotary shaft, a second rotary shaft, a first path, a second path, a planetary gear mechanism, and a second element fixing clutch. The first path is disposed between the first rotary shaft and the second rotary shaft in a transmission path of rotational power from an engine. The second path includes a continuously variable transmission having a motor and a power source for driving the motor, and is connected in parallel to the first path. The planetary gear mechanism includes a first element connected to the first path, a second element connected to the second path, and a third element connected to the first rotary shaft or the second rotary shaft.

The second element fixing clutch is switched between a released state and an engaged state. In the released state, the second element fixing clutch releases the second element so that the second element is rotatable. In the engaged state, the second element fixing clutch fixes the second element so that the second element is non-rotatable.

The transmission is switched between at least two modes of a first continuously variable transmission mode, a second continuously variable transmission mode, and a direct mode, by the second element fixing clutch being switched between the released state and the engaged state. In the first continuously variable transmission mode, rotational power from the engine is transmitted from the first rotary shaft to the second rotary shaft not through the first path but through the second path. In the second continuously variable transmission mode, the rotational power from the engine is transmitted from the first rotary shaft to the second rotary shaft through both the first path and the second path. In the direct mode, the rotational power from the engine is transmitted from the first rotary shaft to the second rotary shaft not through the second path but through the first path.

A transmission according to a second aspect includes a first rotary shaft, a second rotary shaft, a first path, a second path, a planetary gear mechanism, and an element coupling clutch. The first path is disposed between the first rotary shaft and the second rotary shaft in a transmission path of rotational power from an engine. The second path includes a continuously variable transmission having a motor and a power source for driving the motor, and is connected in parallel to the first path. The planetary gear mechanism includes a first element connected to the first path, a second element connected to the second path, and a third element connected to the first rotary shaft or the second rotary shaft.

The element coupling clutch is switched between a released state and an engaged state. In the engaged state, the element coupling clutch couples any two of the first element, the second element, and the third element. In the released state, the element coupling clutch decouples the first element, the second element, and the third element from each other.

The transmission is switched between at least two modes of a first continuously variable transmission mode, a second continuously variable transmission mode, and a direct mode, by the element coupling clutch being switched between the released state and the engaged state. In the first continuously variable transmission mode, rotational power from the engine is transmitted from the first rotary shaft to the second rotary shaft not through the first path but through the second path. In the second continuously variable transmission mode, the rotational power from the engine is transmitted from the first rotary shaft to the second rotary shaft through both the first path and the second path. In the direct mode, the rotational power from the engine is transmitted from the first rotary shaft to the second rotary shaft not through the second path but through the first path.

A transmission according to a third aspect includes a first rotary shaft, a second rotary shaft, a first path, a second path, and a planetary gear mechanism. The first path is disposed between the first rotary shaft and the second rotary shaft in a transmission path of rotational power from an engine. The second path includes a continuously variable transmission having a motor and a power source for driving the motor, and is connected in parallel to the first path. The planetary gear mechanism includes a first element connected to the first path, a second element connected to the second path, and a third element connected to the first rotary shaft or the second rotary shaft.

The first path includes a first shaft member, a second shaft member, and a first path disconnect clutch disposed between the first shaft member and the second shaft member. The first path disconnect clutch is switched between a released state and an engaged state. The first path disconnect clutch disconnects the first shaft member from the second shaft member in the released state. The first path disconnect clutch connects the first shaft member and the second shaft member in the engaged state.

The transmission is switched between at least two modes of a first continuously variable transmission mode, a second continuously variable transmission mode, and a direct mode, by the first path disconnect clutch being switched between the released state and the engaged state. In the first continuously variable transmission mode, rotational power from the engine is transmitted from the first rotary shaft to the second rotary shaft not through the first path but through the second path. In the second continuously variable transmission mode, the rotational power from the engine is transmitted from the first rotary shaft to the second rotary shaft through both the first path and the second path. In the direct mode, the rotational power from the engine is transmitted from the first rotary shaft to the second rotary shaft not through the second path but through the first path.

A control system for a work vehicle according to a fourth aspect includes an engine, the aforementioned transmission, a rotational speed sensor, and a controller. The rotational speed sensor outputs a signal indicating the output rotational speed of the transmission. The controller receives the signal from the rotational speed sensor to control the transmission. The controller switches between at least two modes of the first continuously variable transmission mode, the second continuously variable transmission mode, and the direct mode, according to the output rotational speed of the transmission.

According to the present invention, easy and smooth switching between a plurality of modes can be performed in the transmission.

DETAILED DESCRIPTION OF EMBODIMENT(S)

Figure 1:
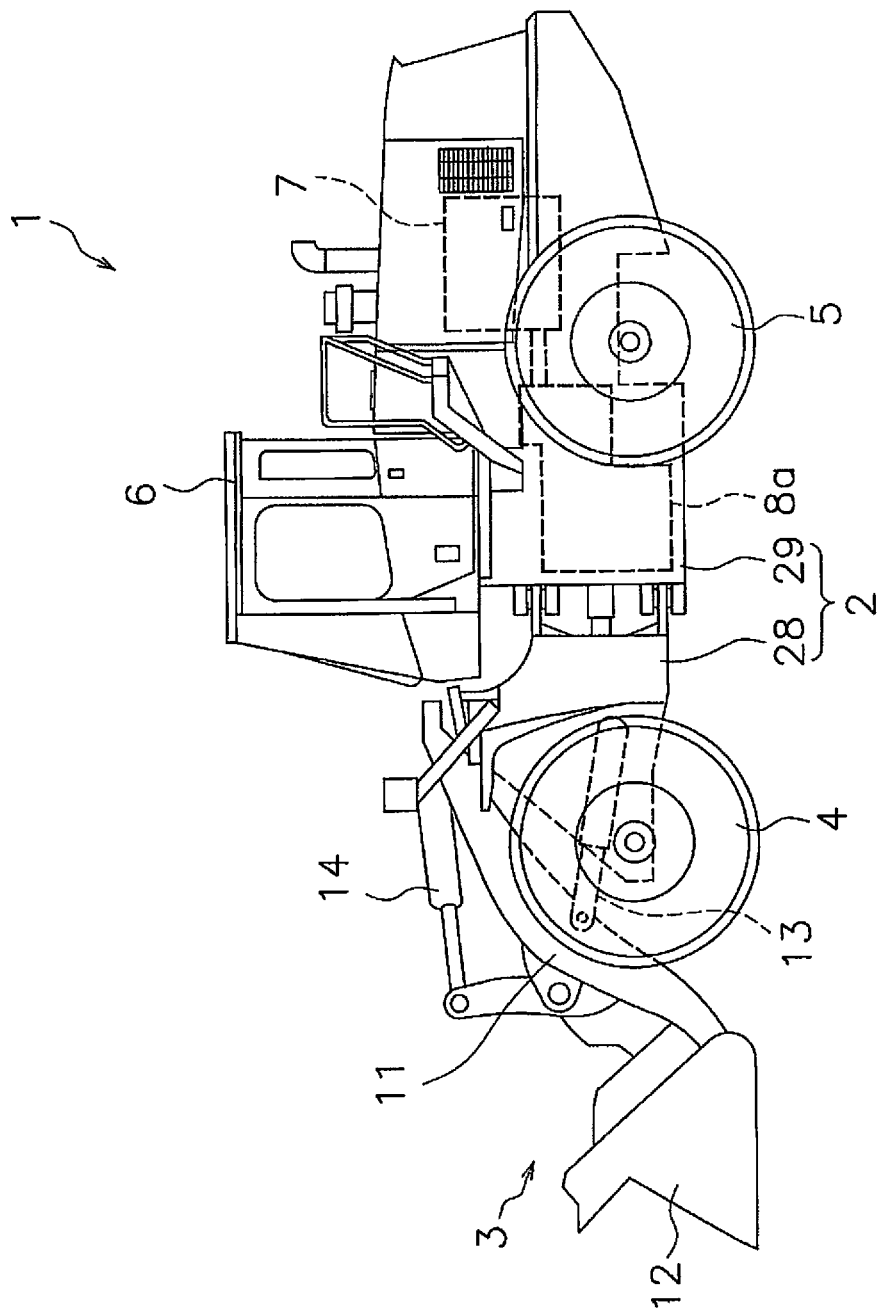
FIG. 1 is a side view of a work vehicle according to an embodiment.
Figure 2:
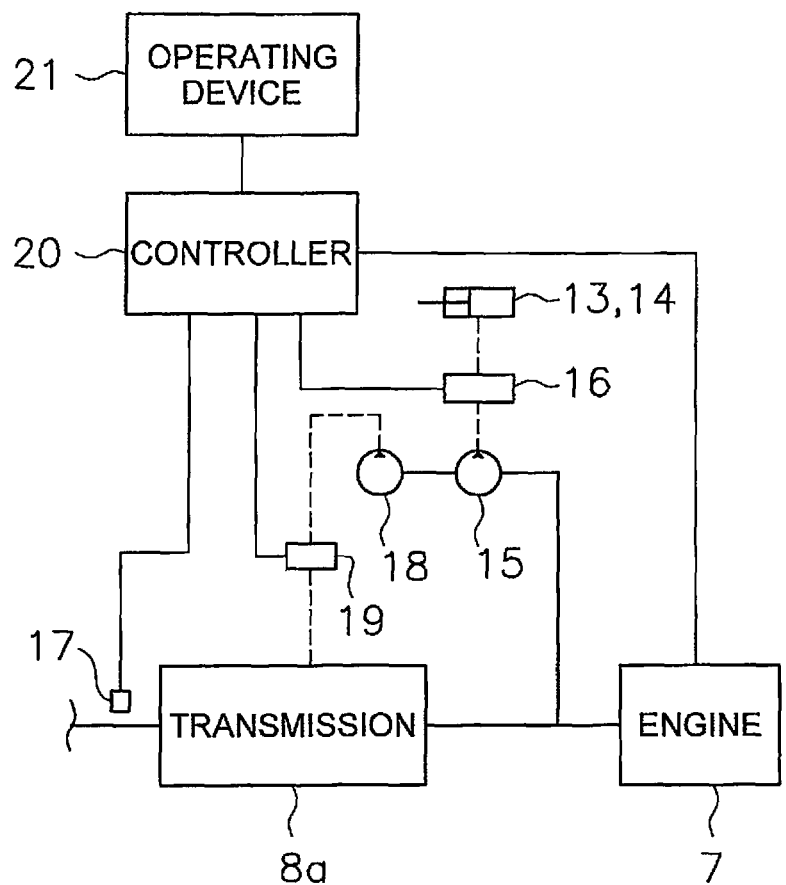
FIG. 2 is a block diagram of a configuration of a control system for the work vehicle.

Embodiments according to the present invention will be described below with reference to the drawings. FIG. 1 is a side view of a work vehicle 1 according to an embodiment of the present invention. FIG. 2 is a block diagram of a configuration of a control system for the work vehicle 1. As illustrated in FIG. 1, the work vehicle 1 includes a vehicle body frame 2, traveling wheels 4 and 5, a work implement 3, an operating cabin 6, an engine 7, and a transmission 8a.

The vehicle body frame 2 includes a front frame 28 and a rear frame 29. The front frame 28 is attached to the front of the rear frame 29. The front frame 28 is rotatably connected to the rear frame 29. The traveling wheels 4 and 5 include front wheels 4 and rear wheels 5. The front wheels 4 are rotatably attached to the front frame 28. The rear wheels 5 are rotatably attached to the rear frame 29.

The work vehicle 1 can perform work such as digging, using the work implement 3. The work implement 3 is driven by hydraulic fluid from a work implement pump 15 illustrated in FIG. 2. The work implement 3 includes a boom 11 and a bucket 12. The work implement 3 includes hydraulic cylinders 13 and 14. The boom 11 and the bucket 12 operate due to the extension and contraction of the hydraulic cylinders 13 and 14 by the hydraulic fluid from the work implement pump 15.

The operating cabin 6 is mounted on the vehicle body frame 2. A seat on which an operator is seated and an operating device 21 illustrated in FIG. 2 are disposed in the operating cabin 6. The operating device 21 includes a lever, a pedal, a switch, or the like. The engine 7 and the transmission 8a are mounted on the vehicle body frame 2. The engine 7 is a diesel engine, for example. The transmission 8a transmits rotational power from the engine 7 to the traveling wheels 4 and 5. As a result, the traveling wheels 4 and 5 are rotationally driven to make the work vehicle 1 travel.

As illustrated in FIG. 2, the work vehicle 1 includes a work implement control valve 16. The work implement control valve 16 controls the flow rate of the hydraulic fluid supplied from the work implement pump 15 to the hydraulic cylinders 13 and 14. The control system for the work vehicle 1 includes a controller 20. The controller 20 includes a processor such as a CPU and a storage device such as a RAM, a ROM, or the like. The controller 20 controls the work implement 3 by controlling the work implement control valve 16 according to an operation of the operating device 21. The controller 20 controls the engine 7 and the transmission 8a according to an operation of the operating device 21.

Next, the transmission 8a will be described in detail. The transmission 8a according to the present embodiment is a transmission in which an HST and a mechanical transmission are combined.

Figures 3A, 3B:
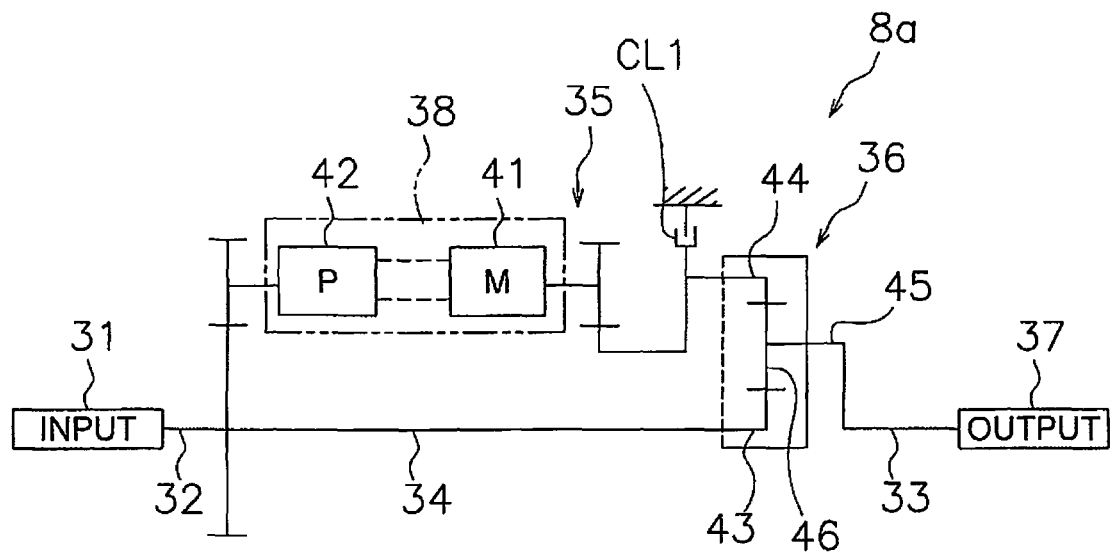
FIG. 3A and FIG. 3B are schematic views of a configuration and control of a transmission according to a first embodiment.

FIG. 3A is a schematic view of a configuration of the transmission 8a according to a first embodiment. As illustrated in FIG. 3A, the transmission 8a includes an input shaft 31, a first rotary shaft 32, a second rotary shaft 33, an output shaft 37, a first path 34, a second path 35, and a planetary gear mechanism 36 and a second element fixing clutch CL1.

Rotational power from the engine 7 is input to the input shaft 31. The first rotary shaft 32 is connected to the input shaft 31. The first rotary shaft 32 may be integrated with the input shaft 31. Alternatively, the first rotary shaft 32 may be connected to the input shaft 31 through a gear or a clutch. The second rotary shaft 33 is connected to the output shaft 37. The second rotary shaft 33 may be integrated with the output shaft 37. Alternatively, the second rotary shaft 33 may be connected to the output shaft 37 through a gear or a clutch.

The first path 34 is disposed between the first rotary shaft 32 and the second rotary shaft 33 in a transmission path of the rotational power from the engine 7. The first path 34 is connected to the first rotary shaft 32.

The second path 35 is connected in parallel to the first path 34. The second path 35 includes a continuously variable transmission 38. The continuously variable transmission 38 includes a motor 41 and a power source 42. In the present embodiment, the continuously variable transmission 38 is an HST, the motor 41 is a hydraulic motor, and the power source 42 is a hydraulic pump. The motor 41 is driven by hydraulic fluid discharged from the power source 42. The power source 42 is connected to the first rotary shaft 32 through a gear.

The planetary gear mechanism 36 includes a sun gear as a first element 43, an outer gear as a second element 44, a planet carrier as a third element 45, and a plurality of planetary gears 46. The first element 43 is connected to the first path 34. The second element 44 is connected to the second path 35. Specifically, the second element 44 is connected to the motor 41. The third element 45 is connected to the second rotary shaft 33. The first element 43, the second element 44, and the third element 45 are not limited to the sun gear, the outer gear, and the planet carrier, and may be changed.

The second element fixing clutch CL1 is connected to the second element 44. The second element fixing clutch CL1 is switched between a released state and an engaged state. In the released state, the second element fixing clutch CL1 releases the second element 44 so that the second element 44 is rotatable. In the engaged state, the second element fixing clutch CL1 fixes the second element 44 so that the second element 44 is non-rotatable. For example, the second element fixing clutch CL1 makes the second element 44 non-rotatable by fixing the second element 44 to a case of the transmission 8a in the engaged state.

The transmission 8a is switched between at least two modes of a first continuously variable transmission mode, a second continuously variable transmission mode, and a direct mode. In the first continuously variable transmission mode, rotational power from the engine 7 is transmitted from the first rotary shaft 32 to the second rotary shaft 33 not through the first path 34 but through the second path 35. In the second continuously variable transmission mode, the rotational power from the engine 7 is transmitted from the first rotary shaft 32 to the second rotary shaft 33 through both the first path 34 and the second path 35. In the direct mode, the rotational power from the engine 7 is transmitted from the first rotary shaft 32 to the second rotary shaft 33 not through the second path 35 but through the first path 34.

In the first embodiment, the transmission 8a is switched between the second continuously variable transmission mode and the direct mode, by the second element fixing clutch CL1 being switched between the engaged state and the released state. FIG. 3B is a table illustrating the relationship between the mode of the transmission 8a and the state of the second element fixing clutch CL1. As illustrated in FIG. 3B, when the second element fixing clutch CL1 is in the released state, the transmission 8a transmits the rotational power from the engine 7 in the second continuously variable transmission mode. When the second element fixing clutch CL1 is in the engaged state, the transmission 8a transmits the rotational power from the engine 7 in the direct mode.

As illustrated in FIG. 2, the work vehicle 1 includes a rotational speed sensor 17. The rotational speed sensor 17 outputs a signal indicating the output rotational speed of the transmission 8a. The controller 20 receives a signal from the rotational speed sensor 17 to control the transmission 8a.

Specifically, the work vehicle 1 includes a transmission pump 18 and a clutch control valve 19. The transmission pump 18 is driven by the engine 7 to discharge hydraulic fluid. The aforementioned second element fixing clutch CL1 is a hydraulic clutch, and the clutch control valve 19 controls the hydraulic pressure supplied from the transmission pump 18 to the second element fixing clutch CL1. The second element fixing clutch CL1 may be electrically controlled.

The controller 20 switches the second element fixing clutch CL between the engaged state and the released state by controlling the clutch control valve 19. The controller 20 switches the transmission 8a between the second continuously variable transmission mode and the direct mode according to the output rotational speed of the transmission 8a. For example, when the output rotational speed of the transmission 8a is less than a predetermined threshold, the controller 20 sets the second element fixing clutch CL1 to the released state. As a result, the transmission 8a transmits the rotational power from the engine 7 in the second continuously variable transmission mode.

When the output rotational speed of the transmission 8a is equal to or greater than a predetermined threshold, the controller 20 sets the second element fixing clutch CL1 to the engaged state. As a result, the transmission 8a transmits the rotational power from the engine 7 in the direct mode.

In the transmission 8a according to the first embodiment described above, the mode of the transmission 8a is switched between the second continuously variable transmission mode and the direct mode, as the second element 44 of the planetary gear mechanism 36 is switched between fixing and releasing by the second element fixing clutch CL1. As a result, easy and smooth switching between the modes can be performed.

In the direct mode, the second element 44 of the planetary gear mechanism 36 is fixed by the second element fixing clutch CL1. Therefore, the second element 44 and the motor 41 are prevented from rotating together. As a result, the transmission efficiency of the rotational power in the transmission 8a can be improved.

Furthermore, because switching between the modes can be achieved with a simple configuration, the size of the transmission 8a can be reduced.

Figures 4A, 4B:
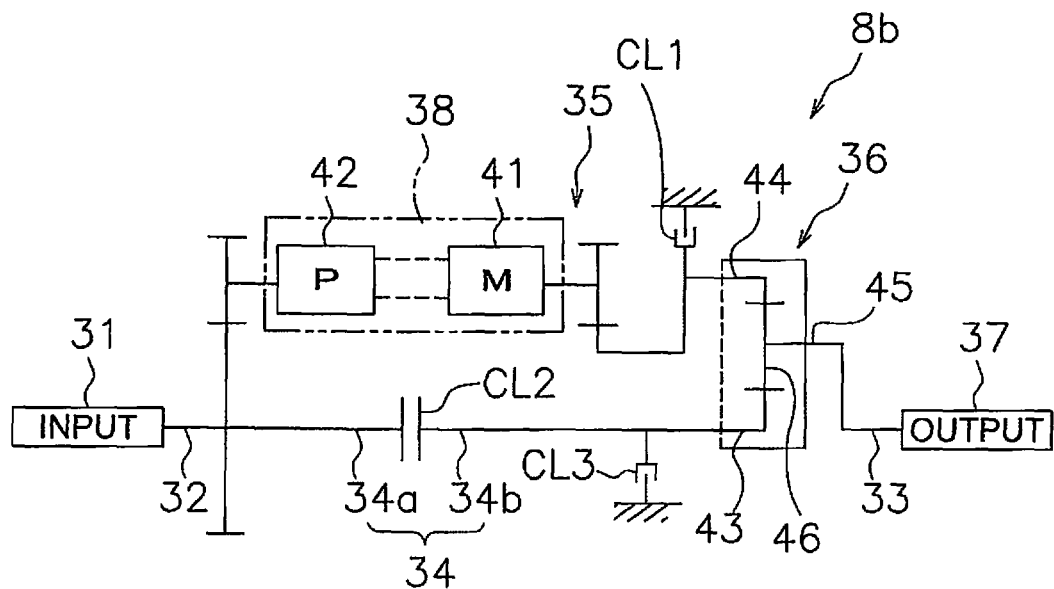
FIG. 4A and FIG. 4B are schematic views of a configuration and control of a transmission according to a first modified example of the first embodiment.

Next, a first modified example of the first embodiment will be described. FIG. 4A is a schematic view of a configuration of a transmission 8b according to the first modified example of the first embodiment. FIG. 4B is a table illustrating the relationship between the mode of the transmission 8b and the state of the clutch.

The transmission 8b further includes a first path disconnect clutch CL2 and a first element fixing clutch CL3. The first path 34 includes a first shaft member 34a and a second shaft member 34b, and the first path disconnect clutch CL2 is disposed between the first shaft member 34a and the second shaft member 34b. The first shaft member 34a is connected to the first rotary shaft 32. The second shaft member 34b is connected to the first element 43. The first path disconnect clutch CL2 disconnects the first shaft member 34a from the second shaft member 34b in a released state. The first path disconnect clutch CL2 connects the first shaft member 34a and the second shaft member 34b in an engaged state.

The first element fixing clutch CL3 is switched between a released state and an engaged state. In the released state, the first element fixing clutch CL3 releases the first element 43 so that the first element 43 is rotatable. In the engaged state, the first element fixing clutch CL3 fixes the first element 43 so that the first element 43 is non-rotatable. For example, in the engaged state, the first element fixing clutch CL3 fixes the first element 43 to a case of the transmission 8b so that the first element 43 is non-rotatable.

As illustrated in FIG. 4B, when the second element fixing clutch CL1 and the first path disconnect clutch CL2 are both in the released state and the first element fixing clutch CL3 is in the engaged state, the transmission 8b transmits rotational power from the engine in the first continuously variable transmission mode. When the second element fixing clutch CL1 and the first element fixing clutch CL3 are both in the released state and the first path disconnect clutch CL2 is in the engaged state, the transmission 8b transmits the rotational power from the engine 7 in the second continuously variable transmission mode. When the second element fixing clutch CL1 and the first path disconnect clutch CL2 are both in the engaged state and the first element fixing clutch CL3 is in the released state, the transmission 8b transmits the rotational power from the engine 7 in the direct mode.

Similarly to the second element fixing clutch CL1, the controller 20 controls the first element fixing clutch CL3 and the first path disconnect clutch CL2. The controller 20 switches the transmission 8b between the first continuously variable transmission mode, the second continuously variable transmission mode, and the direct mode, by controlling the first element fixing clutch CL3, the second element fixing clutch CL1, and the first path disconnect clutch CL2 as described above.

When the output rotational speed of the transmission 8b is less than a predetermined first threshold, the controller 20 sets the transmission 8b to the first continuously variable transmission mode. When the output rotational speed of the transmission 8b is equal to or greater than the predetermined first threshold and less than a predetermined second threshold, the controller 20 sets the transmission 8b to the second continuously variable transmission mode. When the output rotational speed of the transmission 8b is equal to or greater than the predetermined second threshold, the controller 20 sets the transmission 8b to the direct mode. Other configurations are the same as those of the aforementioned transmission 8a according to the first embodiment.

Figures 5A, 5B:
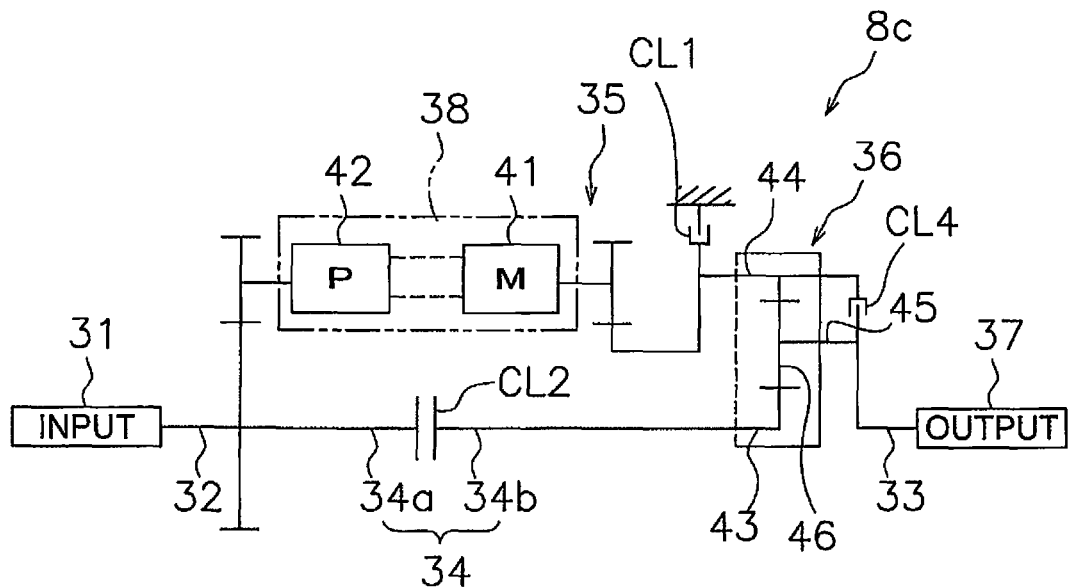
FIG. 5A and FIG. 5B are schematic views of a configuration and control of a transmission according to a second modified example of the first embodiment.

Next, a second modified example of the first embodiment will be described. FIG. 5A is a schematic view of a configuration of a transmission 8c according to the second modified example of the first embodiment. FIG. 5B is a table illustrating the relationship between the mode of the transmission 8c and the state of the clutch.

The transmission 8c includes an element coupling clutch CL4 instead of the first element fixing clutch CL3 in the first modified example. The element coupling clutch CL4 is connected to the second element 44 and the third element 45 of the planetary gear mechanism 36. The element coupling clutch CL4 couples the second element 44 to the third element 45 in an engaged state. As a result, the second element 44 and the third element 45 rotate integrally. The element coupling clutch CL4 decouples the second element 44 from the third element 45 in a released state.

As illustrated in FIG. 5B, when the second element fixing clutch CL1 and the first path disconnect clutch CL2 are both in the released state and the element coupling clutch CL4 is in the engaged state, the transmission 8c transmits rotational power from the engine 7 in the first continuously variable transmission mode. When the second element fixing clutch CL1 and the element coupling clutch CL4 are both in the released state and the first path disconnect clutch CL2 is in the engaged state, the transmission 8c transmits the rotational power from the engine 7 in the second continuously variable transmission mode. When the second element fixing clutch CL1 and the first path disconnect clutch CL2 are both in the engaged state and the element coupling clutch CL4 is in the released state, the transmission 8c transmits the rotational power from the engine 7 in the direct mode.

Similarly to the second element fixing clutch CL1 and the first element fixing clutch CL3, the controller 20 controls the element coupling clutch CL4. The controller 20 switches the transmission 8c between the first continuously variable transmission mode, the second continuously variable transmission mode, and the direct mode, by controlling the second element fixing clutch CL1, the first element fixing clutch CL2, and the element coupling clutch CL4 as described above. Other configurations and switching control of the modes are the same as those of the aforementioned transmissions 8a and 8b.

Figures 6A, 6B:
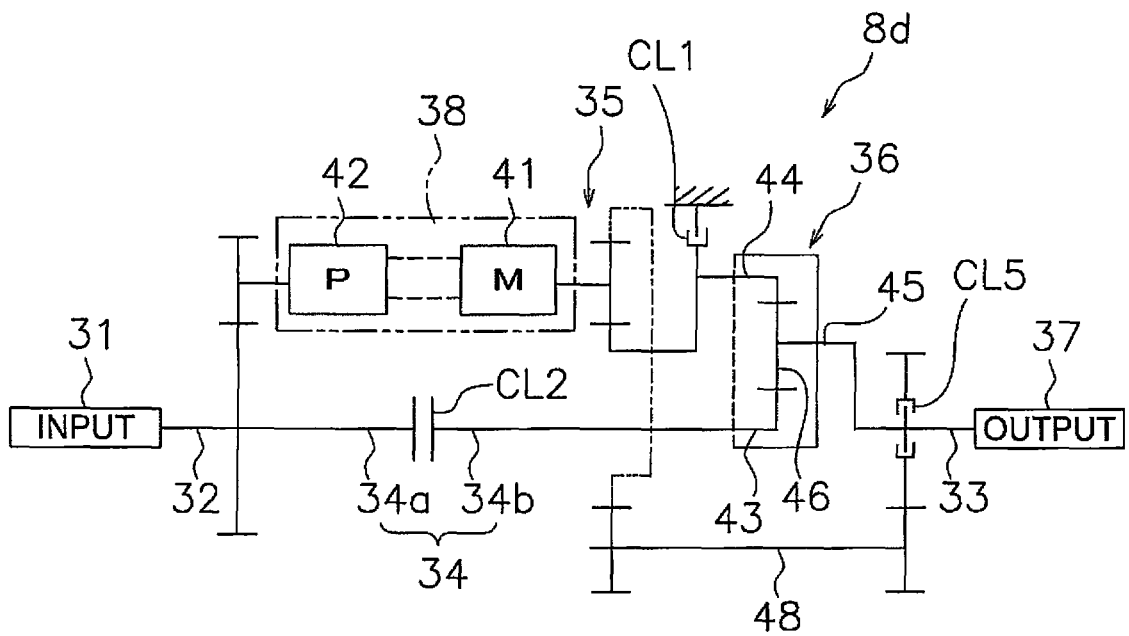
FIG. 6A and FIG. 6B are schematic views of a configuration and control of a transmission according to a third modified example of the first embodiment.

Next, a third modified example of the first embodiment will be described. FIG. 6A is a schematic view of a configuration of a transmission 8d according to the third modified example of the first embodiment. FIG. 6B is a table illustrating the relationship between the mode of the transmission 8d and the state of the clutch.

The transmission 8d includes a bypass clutch CL5 instead of the first element fixing clutch CL3 in the first modified example. The transmission 8d includes a bypass path 48. The bypass path 48 connects the second path 35 to the second rotary shaft 33 not through the planetary gear mechanism 36. Specifically, the bypass path 48 is provided in parallel to the first path 34. The bypass path 48 is connected to the motor 41 through a gear. The bypass path 48 is connected to the second rotary shaft 33 through a gear and the bypass clutch CL5. The bypass clutch CL5 connects the second rotary shaft 33 and the bypass path 48 in an engaged state. The bypass clutch CL5 disconnects the second rotary shaft 33 from the bypass path 48 in a released state.

As illustrated in FIG. 6B, when the second element fixing clutch CL1 and the first path disconnect clutch CL2 are both in the released state and the bypass clutch CL5 is in the engaged state, the transmission 8d transmits rotational power from the engine 7 in the first continuously variable transmission mode. In the first continuously variable transmission mode, the rotational power from the engine 7 is transmitted from the first rotary shaft 32 to the second rotary shaft 33 not through the first path 34 and the planetary gear mechanism 36 but through the second path 35 and the bypass path 48.

When the second element fixing clutch CL1 and the bypass clutch CL5 are both in the released state and the first path disconnect clutch CL2 is in the engaged state, the transmission 8d transmits the rotational power from the engine 7 in the second continuously variable transmission mode. When the second element fixing clutch CL1 and the first path disconnect clutch CL2 are both in the engaged state and the bypass clutch CL5 is in the released state, the transmission 8d transmits the rotational power from the engine 7 in the direct mode.

Similarly to the second element fixing clutch CL1 and the first element fixing clutch CL3, the controller 20 controls the bypass clutch CL5. The controller 20 switches the transmission 8d between the first continuously variable transmission mode, the second continuously variable transmission mode, and the direct mode, by controlling the second element fixing clutch CL1, the first path disconnect clutch CL2, and the bypass clutch CL5 as described above. Other configurations and switching control of the modes are the same as those of the aforementioned transmissions 8a to 8c.

Figures 7A, 7B:
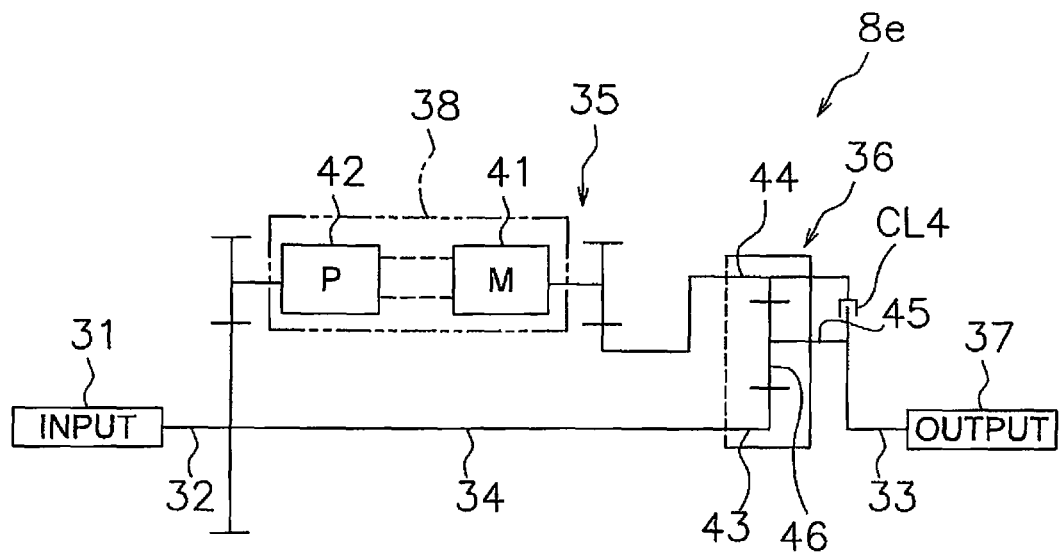
FIG. 7A and FIG. 7B are schematic views of a configuration and control of a transmission according to a second embodiment.

Next, a transmission 8e according to a second embodiment will be described. FIG. 7A is a schematic view of a configuration of the transmission 8e according to the second embodiment. FIG. 7B is a table illustrating the relationship between the mode of the transmission 8e and the state of the clutch.

As illustrated in FIG. 7A, the transmission 8e includes the element coupling clutch CL4. The element coupling clutch CL4 is the same as that in the second modified example of the first embodiment. However, the transmission 8e does not include the second element fixing clutch CL1 and the first path disconnect clutch CL2.

As illustrated in FIG. 7B, when the element coupling clutch CL4 is in the released state, the transmission 8e transmits rotational power from the engine 7 in the second continuously variable transmission mode. When the element coupling clutch CL4 is in the engaged state, the transmission 8e transmits the rotational power from the engine 7 in the direct mode. Other configurations and switching control of the modes are the same as those of the transmissions 8a to 8d.

Figures 8A, 8B:
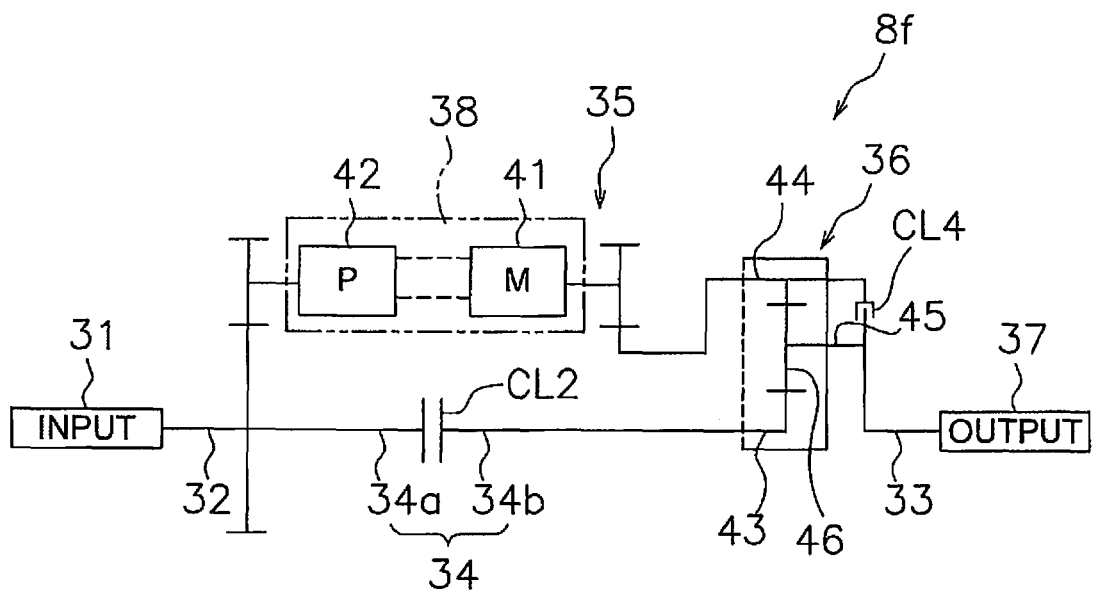
FIG. 8A and FIG. 8B are schematic views of a configuration and control of a transmission according to a first modified example of the second embodiment.

Next, a transmission 8f according to a first modified example of the second embodiment will be described. FIG. 8A is a schematic view of a configuration of the transmission 8f. FIG. 8B is a table illustrating the relationship between the mode of the transmission 8f and the state of the clutch.

As illustrated in FIG. 8A, the transmission 8f further includes the first path disconnect clutch CL2 as compared to the transmission 8e according to the second embodiment. The first path disconnect clutch CL2 is the same as that according to the first modified example of the first embodiment.

As illustrated in FIG. 8B, when the element coupling clutch CL4 is in the engaged state and the first path disconnect clutch CL2 is in the released state, the transmission 8f transmits rotational power from the engine 7 in the first continuously variable transmission mode. When the element coupling clutch CL4 is in the released state and the first path disconnect clutch CL2 is in the engaged state, the transmission 8f transmits the rotational power from the engine 7 in the second continuously variable transmission mode. When the first path disconnect clutch CL2 and the element coupling clutch CL4 are both in the engaged state, the transmission 8f transmits the rotational power from the engine 7 in the direct mode. Other configurations and switching control of the modes are the same as those of the transmissions 8a to 8e.

Figures 9A, 9B:
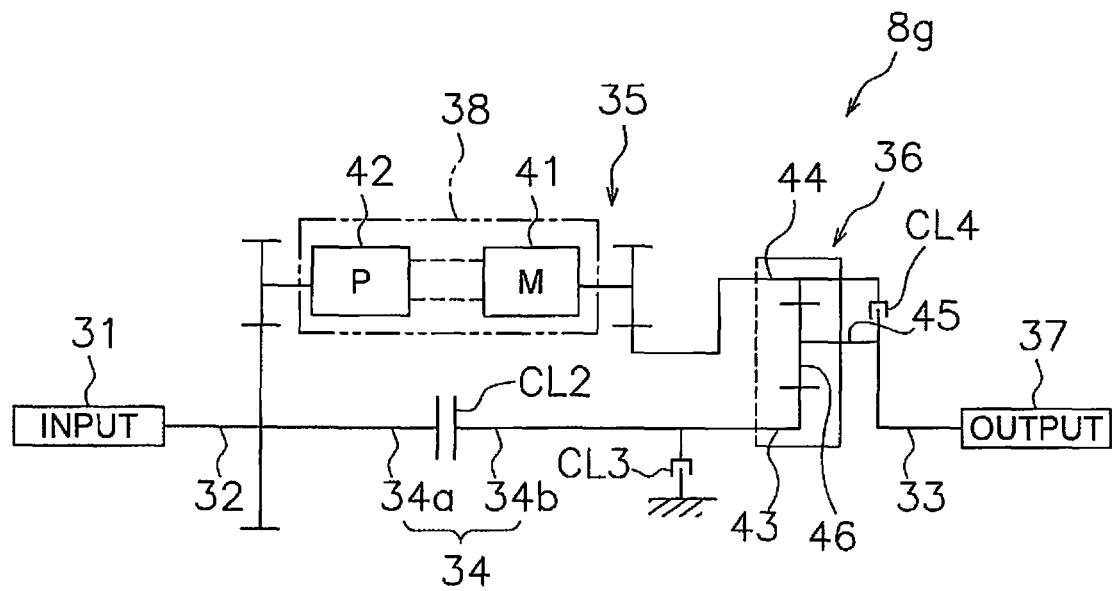
FIG. 9A and FIG. 9B are schematic views of a configuration and control of a transmission according to a second modified example of the second embodiment.

Next, a transmission 8g according to a second modified example of the second embodiment will be described. FIG. 9A is a schematic view of a configuration of the transmission 8g. FIG. 9B is a table illustrating the relationship between the mode of the transmission 8g and the state of the clutch.

As illustrated in FIG. 9A, the transmission 8g further includes the first element fixing clutch CL3 as compared to the transmission 8f according to the first modified example of the second embodiment. The first element fixing clutch CL3 is the same as that according to the first modified example of the first embodiment.

As illustrated in FIG. 9B, when the element coupling clutch CL4 and the first path disconnect clutch CL2 are both in the released state and the first element fixing clutch CL3 is in the engaged state, the transmission 8g transmits rotational power from the engine 7 in the first continuously variable transmission mode. When the first element fixing clutch CL3 and the first path disconnect clutch CL2 are both in the released state and the element coupling clutch CL4 is in the engaged state, the transmission 8g transmits the rotational power from the engine 7 in the first continuously variable transmission mode.

When the first element fixing clutch CL3 and the element coupling clutch CL4 are both in the released state and the first path disconnect clutch CL2 is in the engaged state, the transmission 8g transmits the rotational power from the engine 7 in the second continuously variable transmission mode. When the first path disconnect clutch CL2 and the element coupling clutch CL4 are both in the engaged state and the first element fixing clutch CL3 is in the released state, the transmission 8g transmits the rotational power from the engine 7 in the direct mode. Other configurations and switching control of the modes are the same as those of the transmissions 8a to 8f.

Figures 10A, 10B:
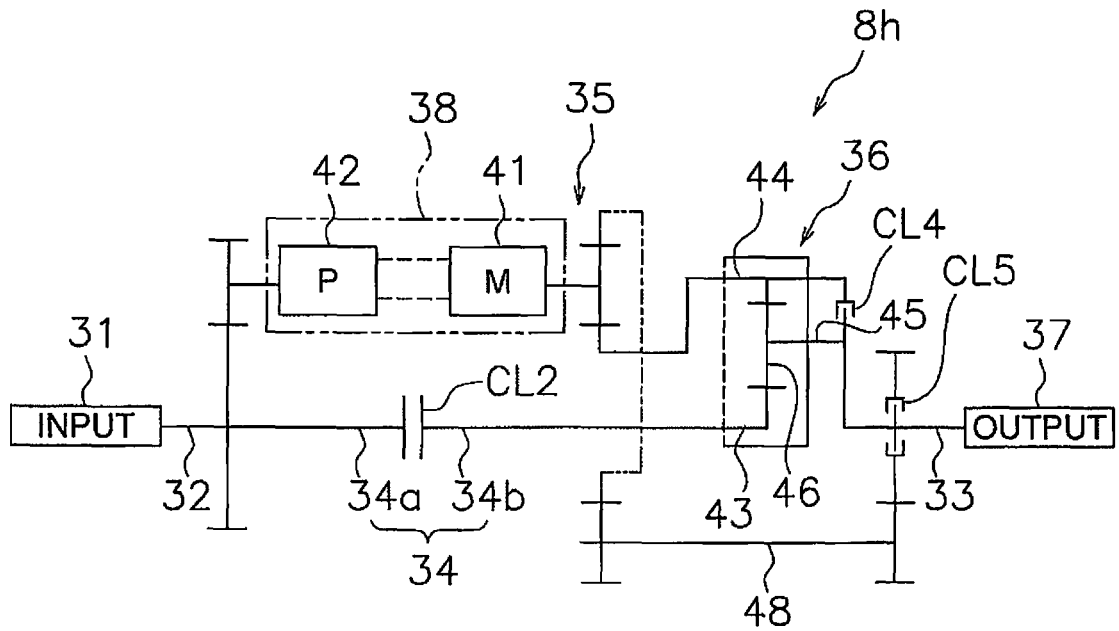
FIG. 10A and FIG. 10B are schematic views of a configuration and control of a transmission according to a third modified example of the second embodiment.

Next, a transmission 8h according to a third modified example of the second embodiment will be described. FIG. 10A is a schematic view of a configuration of the transmission 8*h*. FIG. 10B is a table illustrating the relationship between the mode of the transmission 8*h* and the state of the clutch.

As illustrated in FIG. 10A, the transmission 8*h* further includes the bypass path 48 and the bypass clutch CL5 as compared to the transmission 8*f* according to the first modified example of the second embodiment. The bypass path 48 and the bypass clutch CL5 are the same as those according to the third modified example of the first embodiment.

As illustrated in FIG. 10B, when the element coupling clutch CL4 and the first path disconnect clutch CL2 are both in the released state and the bypass clutch CL5 is in the engaged state, the transmission 8*h* transmits rotational power from the engine in the first continuously variable transmission mode. When the bypass clutch CL5 and the first path disconnect clutch CL2 are both in the released state and the element coupling clutch CL4 is in the engaged state, the transmission 8*h* transmits the rotational power from the engine 7 in the first continuously variable transmission mode.

When the element coupling clutch CL4 and the bypass clutch CL5 are both in the released state and the first path disconnect clutch CL2 is in the engaged state, the transmission 8*h* transmits the rotational power from the engine 7 in the second continuously variable transmission mode. When the element coupling clutch CL4 and the first path disconnect clutch CL2 are both in the engaged state and the bypass clutch CL5 is in the released state, the transmission 8*h* transmits the rotational power from the engine 7 in the direct mode. Other configurations and switching control of the modes are the same as those of the transmissions 8*a* to 8*g*.

Figures 11A, 11B:
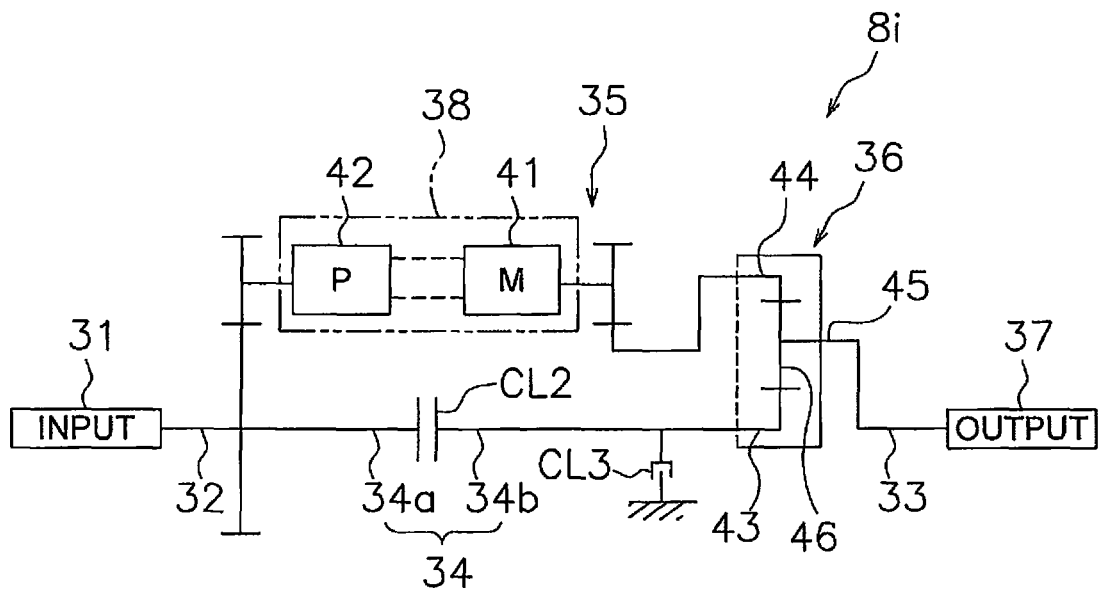
FIG. 11A and FIG. 11B are schematic views of a configuration and control of a transmission according to a third embodiment.

Next, a transmission 8*i* according to a third embodiment will be described. FIG. 11A is a schematic view of a configuration of the transmission 8*i*. FIG. 11B is a table illustrating the relationship between the mode of the transmission 8*i* and the state of the clutch.

As illustrated in FIG. 11A, the transmission 8*i* includes the first path disconnect clutch CL2 and the first element fixing clutch CL3. The first path disconnect clutch CL2 and the first element fixing clutch CL3 are the same as those according to the first modified example of the first embodiment. However, the transmission 8*i* does not include the second element fixing clutch CL1.

As illustrated in FIG. 11B, when the first path disconnect clutch CL2 is in the released state and the first element fixing clutch CL3 is in the engaged state, the transmission 8*i* transmits rotational power from the engine 7 in the first continuously variable transmission mode. When the first path disconnect clutch CL2 is in the engaged state and the first element fixing clutch CL3 is in the released state, the transmission 8*i* transmits the rotational power from the engine 7 in the second continuously variable transmission mode. Other configurations and switching control of the modes are the same as those of the transmissions 8*a* to 8*h*.

Figures 12A, 12B:
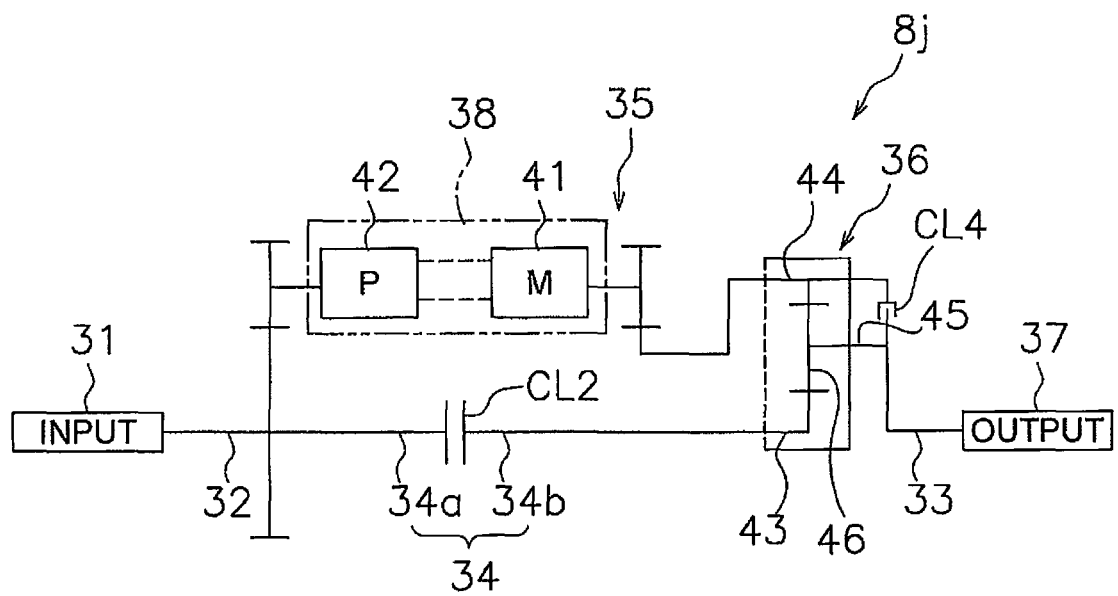
FIG. 12A and FIG. 12B are schematic views of a configuration and control of a transmission according to a first modified example of the third embodiment.

Next, a transmission 8*j* according to a first modified example of the third embodiment will be described. FIG. 12A is a schematic view of a configuration of the transmission 8*j*. FIG. 12B is a table illustrating the relationship between the modes of the transmission 8*j* and the state of the clutch.

As illustrated in FIG. 12A, the transmission 8*j* includes the element coupling clutch CL4 instead of the first element fixing clutch CL3 as compared to the transmission 8*i* according to the third embodiment. The configuration of the transmission 8*j* is the same as that of the transmission 8*f* according to the first modified example of the second embodiment. However, as illustrated in FIG. 12B, the controller 20 switches the transmission 8*j* between the first continuously variable transmission mode and the second continuously variable transmission mode. Other configurations and switching control of the modes are the same as those of the transmissions 8*a* to 8*i*.

Figures 13A, 13B:
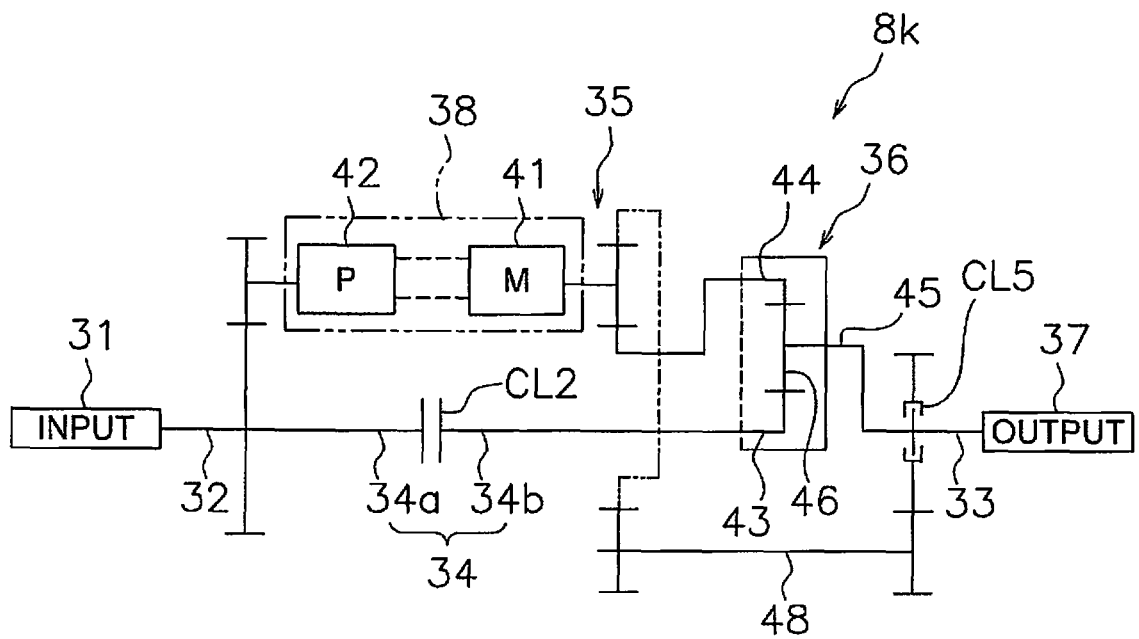
FIG. 13A and FIG. 13B are schematic views of a configuration and control of a transmission according to a second modified example of the third embodiment.

Next, a transmission 8*k* according to a second modified example of the third embodiment will be described. FIG. 13A is a schematic view of a configuration of the transmission 8*k*. FIG. 13B is a table illustrating the relationship between the mode of the transmission 8*k* and the state of the clutch.

As illustrated in FIG. 13A, the transmission 8*k* further includes the bypass path 48 and the bypass clutch CL5 instead of the first element fixing clutch CL3 as compared to the transmission 8*i* according to the third embodiment. The bypass path 48 and the bypass clutch CL5 are the same as those according to the third modified example of the first embodiment.

As illustrated in FIG. 13B, when the first path disconnect clutch CL2 is in the released state and the bypass clutch CL5 is in the engaged state, the transmission 8*k* transmits rotational power from the engine 7 in the first continuously variable transmission mode. When the first path disconnect clutch CL2 is in the engaged state and the bypass clutch CL5 is in the released state, the transmission 8*k* transmits the rotational power from the engine 7 in the second continuously variable transmission mode. Other configurations and switching control of the modes are the same as those of the transmissions 8*a* to 8*j*.

Figures 14A, 14B:
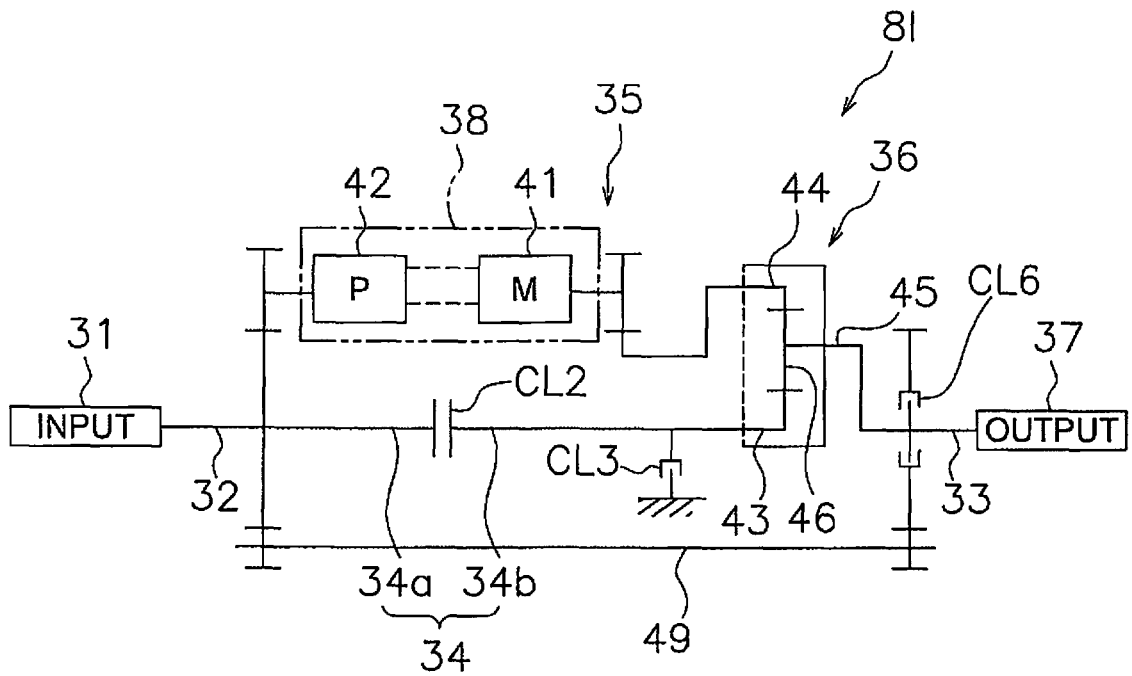
FIG. 14A and FIG. 14B are schematic views of a configuration and control of a transmission according to a third modified example of the third embodiment.

Next, a transmission 8*l* according to a third modified example of the third embodiment will be described. FIG. 14A is a schematic view of a configuration of the transmission 8*l*. FIG. 14B is a table illustrating the relationship between the mode of the transmission 8*l* and the state of the clutch.

As illustrated in FIG. 14A, the transmission 8*l* further includes a direct path 49 and a direct clutch CL6 as compared to the transmission 8*i* according to the third embodiment. The direct path 49 connects the first rotary shaft 32 to the second rotary shaft 33 not through the first path 34, the second path 35, and the planetary gear mechanism 36. The direct path 49 is provided in parallel to the first path 34, and is connected to the first rotary shaft 32 through a gear. The direct path 49 is connected to the second rotary shaft 33 through a gear and the direct clutch CL6.

The direct clutch CL6 switches between connection and disconnection of the second rotary shaft 33 and the direct path 49. The direct clutch CL6 connects the second rotary shaft 33 and the direct path 49 in an engaged state. The direct clutch CL6 disconnects the second rotary shaft 33 from the direct path 49 in a released state. Similarly to the first path disconnect clutch CL2 and the first element fixing clutch CL3, the controller 20 controls the direct clutch CL6.

As illustrated in FIG. 14B, when the first path disconnect clutch CL2 and the direct clutch CL6 are both in the released state and the first element fixing clutch CL3 is in the engaged state, the transmission 8*l* transmits rotational power from the engine 7 in the first continuously variable transmission mode. When the first path disconnect clutch CL2 is in the engaged state and the direct clutch CL6 and the first element fixing clutch CL3 are both in the released state, the transmission 8*l* transmits the rotational power from the engine 7 in the second continuously variable transmission mode.

In FIG. 14B, "-" means that the state may be either the released state or the engaged state. Accordingly, when the first path disconnect clutch CL2 is in the released state or the engaged state, the first element fixing clutch CL3 is in the released state, and the direct clutch CL6 is in the engaged state, the transmission 8*l* transmits the rotational power from the engine 7 in the direct mode. When the first path disconnect clutch CL2 is in the released state, the first element fixing clutch CL3 is in the released state or the engaged state, and the direct clutch CL6 is in the engaged state, the transmission 8*l* transmits the rotational power from the engine in the direct mode.

Other configurations and switching control of the modes are the same as those of the transmissions 8*a* to 8*k*.

Figures 15A, 15B:
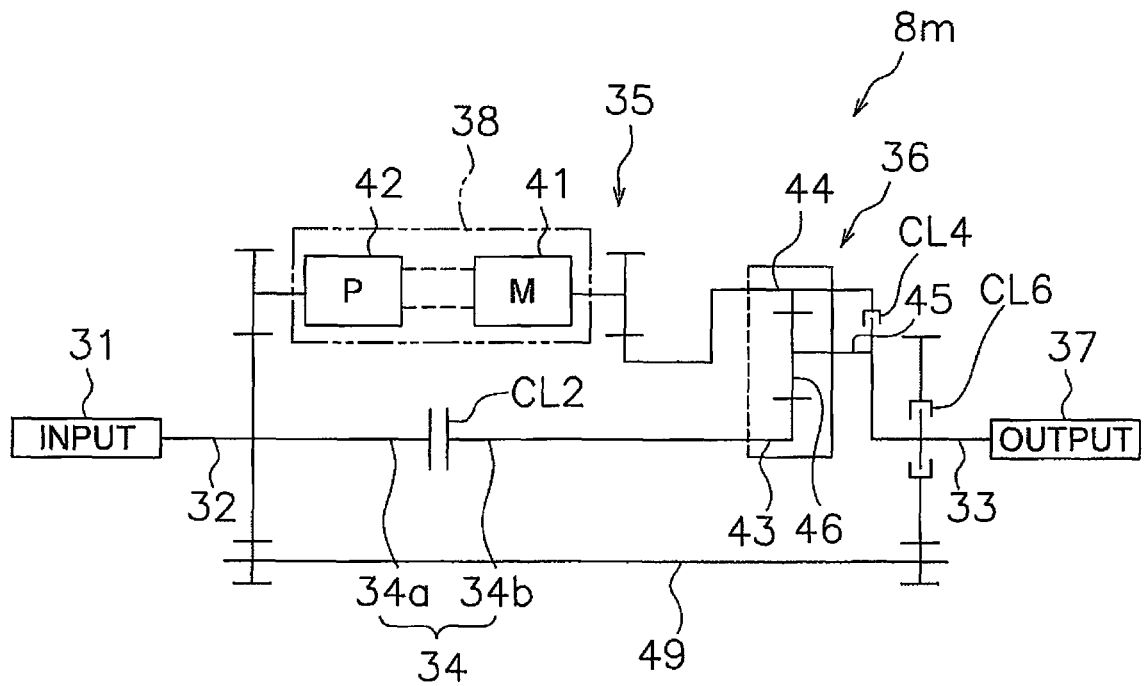
FIG. 15A and FIG. 15B are schematic views of a configuration and control of a transmission according to a fourth modified example of the third embodiment.

Next, a transmission 8*m* according to a fourth modified example of the third embodiment will be described. FIG. 15A is a schematic view of a configuration of the transmission 8*m*. FIG. 15B is a table illustrating the relationship between the mode of the transmission 8*m* and the state of the clutch.

As illustrated in FIG. 15A, the transmission 8*m* includes the element coupling clutch CL4 instead of the first element fixing clutch CL3 as compared to the transmission 8*l* according to the third modified example of the third embodiment. The element coupling clutch CL4 is the same as that according to the second modified example of the first embodiment.

As illustrated in FIG. 15B, when the first path disconnect clutch CL2 and the direct clutch CL6 are both in the released state and the element coupling clutch CL4 is in the engaged state, the transmission 8*m* transmits rotational power from the engine 7 in the first continuously variable transmission mode. When the first path disconnect clutch CL2 is in the engaged state and the direct clutch CL6 and the element coupling clutch CL4 are both in the released state, the transmission 8*m* transmits the rotational power from the engine 7 in the second continuously variable transmission mode.

When the first path disconnect clutch CL2 is in the released state or the engaged state, the element coupling clutch CL4 is in the released state, and the direct clutch CL6 is in the engaged state, the transmission 8*m* transmits the rotational power from the engine 7 in the direct mode. When the first path disconnect clutch CL2 is in the released state, the element coupling clutch CL4 is in the released state or the engaged state, and the direct clutch CL6 is in the engaged state, the transmission 8*m* transmits the rotational power from the engine in the direct mode.

Other configurations and switching control of the mode are the same as those of the transmissions 8*a* to 8*l*.

Figures 16A, 16B:
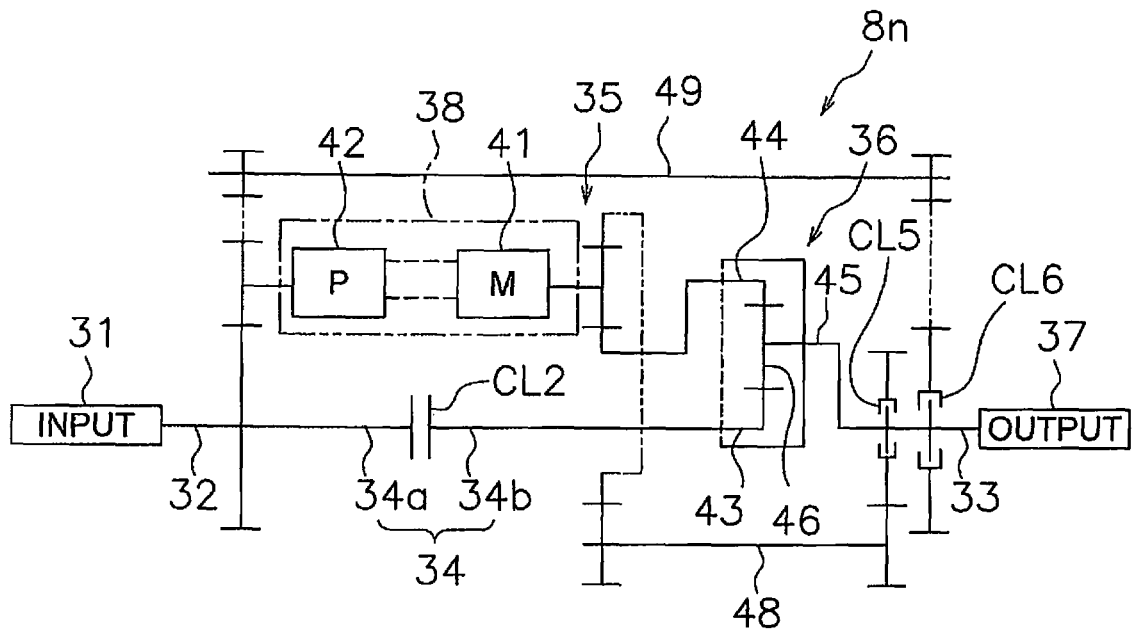
FIG. 16A and FIG. 16B are schematic views of a configuration and control of a transmission according to a fifth modified example of the third embodiment.

Next, a transmission 8*n* according to a fifth modified example of the third embodiment will be described. FIG. 16A is a schematic view of a configuration of the transmission 8*n*. FIG. 16B is a table illustrating the relationship between the mode of the transmission 8*n* and the state of the clutch.

As illustrated in FIG. 16A, the transmission 8*n* further includes the direct path 49 and the direct clutch CL6 as compared to the transmission 8*k* according to the second modified example of the third embodiment. The direct path 49 and the direct clutch CL6 are the same as those of the transmission 8*l* according to the third modified example of the third embodiment.

As illustrated in FIG. 16B, when the first path disconnect clutch CL2 and the direct clutch CL6 are both in the released state and the bypass clutch CL5 is in the engaged state, the transmission 8*n* transmits rotational power from the engine 7 in the first continuously variable transmission mode. When the first path disconnect clutch CL2 is in the engaged state and the direct clutch CL6 and the bypass clutch CL5 are both in the released state, the transmission 8*n* transmits the rotational power from the engine 7 in the second continuously variable transmission mode.

When the first path disconnect clutch CL2 is in the released state or the engaged state, the bypass clutch CL5 is in the released state, and the direct clutch CL6 is in the engaged state, the transmission 8*n* transmits the rotational power from the engine 7 in the direct mode. When the first path disconnect clutch CL2 is in the released state, the bypass clutch CL5 is in the released state or the engaged state, and the direct clutch CL6 is in the engaged state, the transmission 8*n* transmits the rotational power from the engine 7 in the direct mode.

Other configurations and switching control of the modes are the same as those of the transmissions 8*a* to 8*m*.

Although embodiments of the present invention have been described so far, the present invention is not limited to the above embodiments and various modifications may be made within the scope of the invention.

The work vehicle 1 is not limited to a wheel loader, and may be another type of work vehicle such as a motor grader, a hydraulic excavator, or a bulldozer.

The work vehicle 1 is not limited to the HMT, and may include another type of continuously variable transmission such as EMT. That is, the motor 41 of the continuously variable transmission 38 described above may be an electric motor, and the power source 42 may be a generator. Alternatively, the electric power generated by the generator may be stored in a power storage device such as a battery, and the motor 41 may be driven by the electric power from the power storage device.

In the above embodiments, the transmissions 8*a* to 8*n* are of an "output split type" in which an output side of the continuously variable transmission 38 is connected to an input side of the planetary gear mechanism 36. However, the transmission may be of an "input split type" in which an input side of the continuously variable transmission 38 is connected to an output side of the planetary gear mechanism 36.

Figure 17:
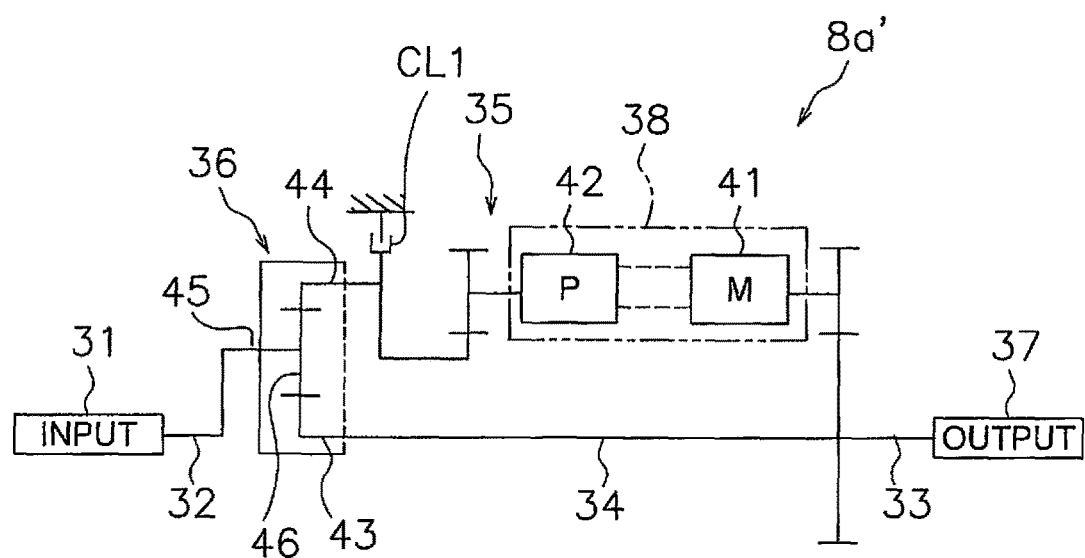
FIG. 17 is a schematic view of a configuration and control of a transmission according to another embodiment.
Figure 18:
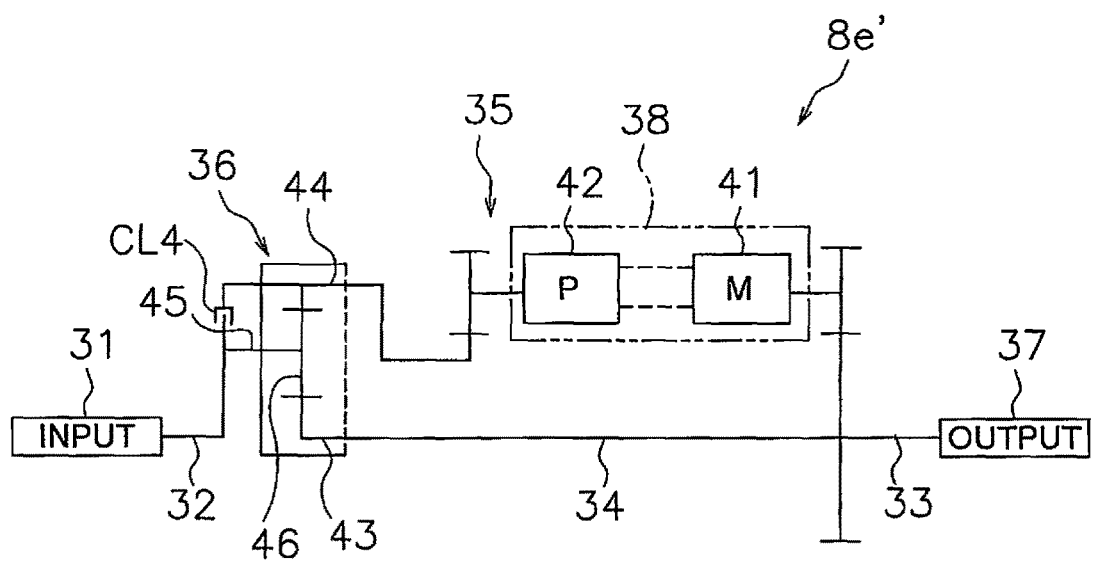
FIG. 18 is a schematic view of a configuration and control of a transmission according to another embodiment.
Figure 19:
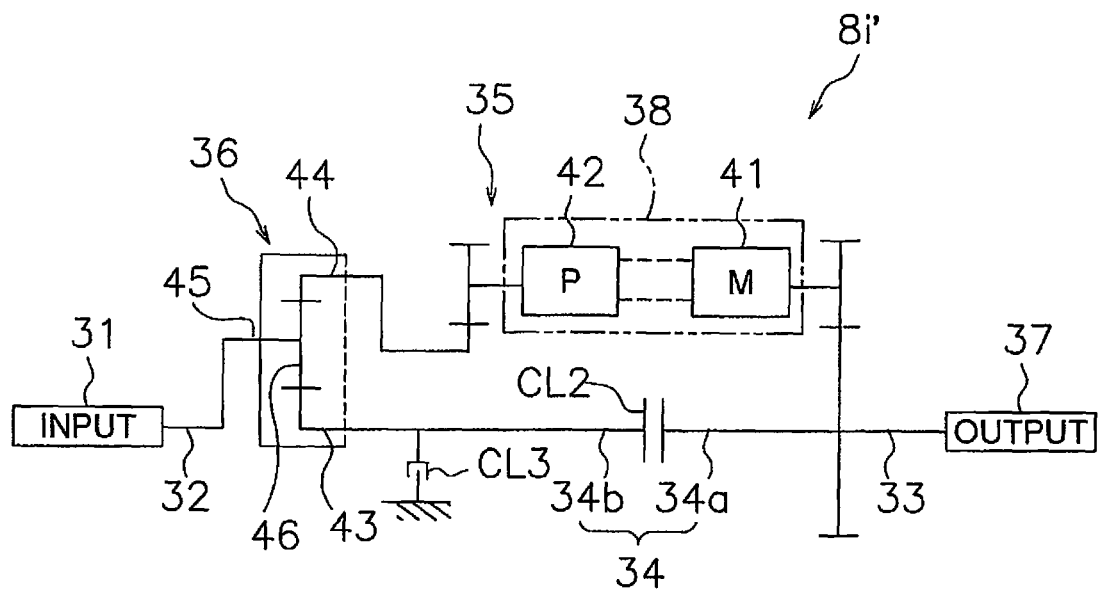
FIG. 19 is a schematic view of a configuration and control of a transmission according to another embodiment.

For example, FIG. 17 is a modified example in which the configuration of the transmission 8*a* according to the first embodiment is applied to the input split type. FIG. 18 is a modified example in which the configuration of the transmission 8*e* according to the second embodiment is applied to the input split type. FIG. 19 is a modified example in which the configuration of the transmission 8*i* according to the third embodiment is applied to the input split type. The third element 45 of the planetary gear mechanism 36 may be connected to the first rotary shaft 32, as in the input split type of the transmissions 8*a*', 8*e*', and 8*i*' illustrated in FIGS. 17 to 19. The second element 44 of the planetary gear mechanism 36 may be connected to the power source 42. The motor 41 may be connected to the second rotary shaft 33 through a gear.

Figure 20:
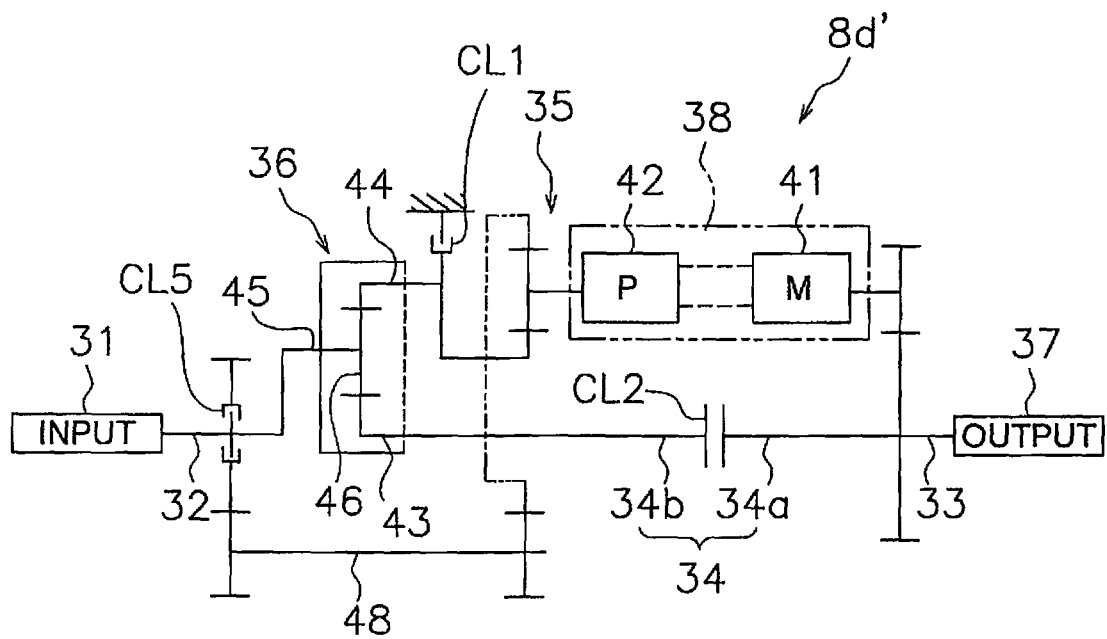
FIG. 20 is a schematic view of a configuration and control of a transmission according to another embodiment.

FIG. 20 is a modified example in which the configuration of the transmission 8*d* according to the third modified example of the first embodiment is applied to the input split type. As illustrated in FIG. 20, in the input split type of the transmission 8*d*', the bypass path 48 may be connected to the first rotary shaft 32. The bypass clutch CL5 may switch between connection and disconnection of the first rotary shaft 32 and the bypass path 48.

Figure 21:
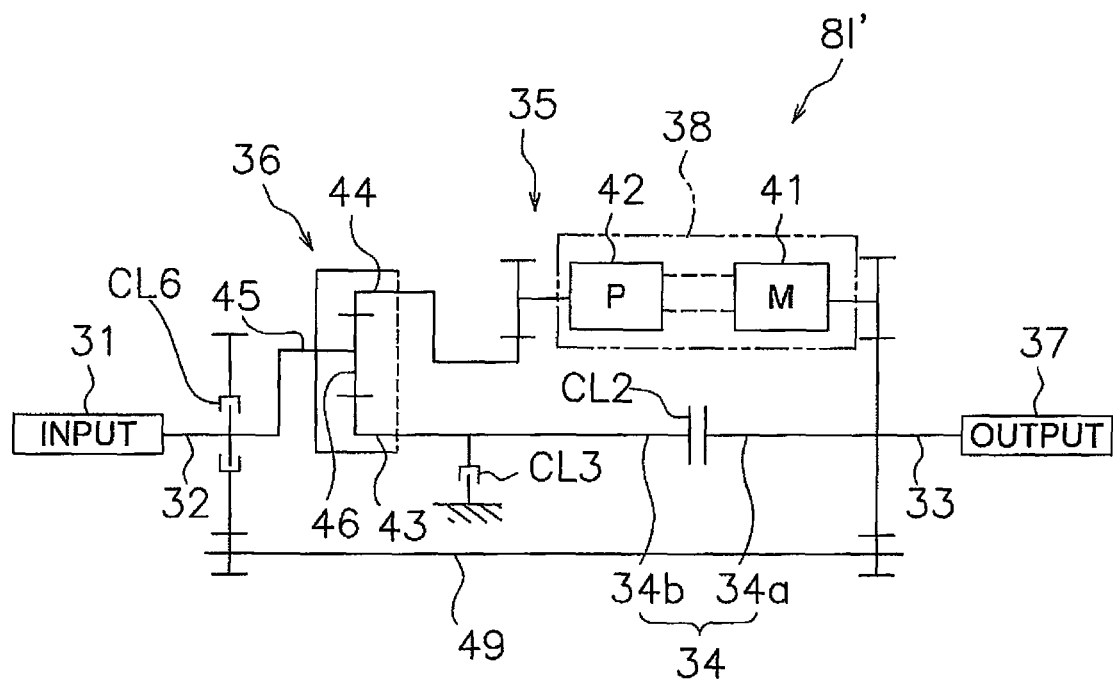
FIG. 21 is a schematic view of a configuration and control of a transmission according to another embodiment.

FIG. 21 is a modified example in which the configuration of the transmission 8*l* according to the third modified example of the third embodiment is applied to the input split type. As illustrated in FIG. 21, in the input split type of the transmission 8*l*, the direct clutch CL6 may switch between connection and disconnection of the first rotary shaft 32 and the direct path 49.

Similarly, another modified example may be applied to the input split type of the transmission 8.

According to the present invention, easy and smooth switching between a plurality of modes can be performed in the transmission.

The invention claimed is:

1. A transmission for transmitting rotational power from an engine, the transmission comprising:
   a first rotary shaft;
   a second rotary shaft;
   a first path disposed between the first rotary shaft and the second rotary shaft in a transmission path of the rotational power from the engine;
   a second path including a continuously variable transmission having a motor and a power source to drive the motor, the second path being connected in parallel to the first path;
   a planetary gear mechanism including a first element connected to the first path, a second element connected to the second path, and a third element connected to the first rotary shaft or the second rotary shaft; and
   a second element fixing clutch configured to be switched between a released state in which the second element is rotatably released and an engaged state in which the second element is non-rotatably fixed,
   the transmission being configured to be switched between at least two modes of a first continuously variable transmission mode, a second continuously variable transmission mode, and a direct mode, by the second element fixing clutch being switched between the released state and the engaged state,
   in the first continuously variable transmission mode, the rotational power from the engine being transmitted from the first rotary shaft to the second rotary shaft not through the first path but through the second path,
   in the second continuously variable transmission mode, the rotational power from the engine being transmitted from the first rotary shaft to the second rotary shaft through both the first path and the second path, and
   in the direct mode, the rotational power from the engine being transmitted from the first rotary shaft to the second rotary shaft not through the second path but through the first path.

2. The transmission according to claim 1, wherein
   the transmission is further configured to
      transmit the rotational power from the engine in the second continuously variable transmission mode, when the second element fixing clutch is in the released state, and
      transmit the rotational power from the engine in the direct mode, when the second element fixing clutch is in the engaged state.

3. The transmission according to claim 1, wherein
   the first path includes a first shaft member, a second shaft member, and a first path disconnect clutch disposed between the first shaft member and the second shaft member,
   the first path disconnect clutch disconnects the first shaft member from the second shaft member in a released state, and connects the first shaft member and the second shaft member in an engaged state, and
   the transmission is further configured to
      transmit the rotational power from the engine in the first continuously variable transmission mode, when the second element fixing clutch and the first path disconnect clutch are both in the released state,
      transmit the rotational power from the engine in the second continuously variable transmission mode, when the second element fixing clutch is in the released state and the first path disconnect clutch is in the engaged state, and
      transmit the rotational power from the engine in the direct mode, when the second element fixing clutch and the first path disconnect clutch are both in the engaged state.

4. The transmission according to claim 3, further comprising:
   a first element fixing clutch configured to be switched between a released state in which the first element is rotatably released and an engaged state in which the first element is non-rotatably fixed,
   the transmission being further configured to
      transmit the rotational power from the engine in the first continuously variable transmission mode, when the second element fixing clutch and the first path disconnect clutch are both in the released state and the first element fixing clutch is in the engaged state,
      transmit the rotational power from the engine in the second continuously variable transmission mode, when the second element fixing clutch and the first element fixing clutch are both in the released state and the first path disconnect clutch is in the engaged state, and
      transmit the rotational power from the engine in the direct mode, when the second element fixing clutch and the first path disconnect clutch are both in the engaged state and the first element fixing clutch is in the released state.

5. The transmission according to claim 3, further comprising:
   an element coupling clutch configured to be switched between
      an engaged state in which the element coupling clutch couples any two of the first element, the second element, and the third element and
      a released state in which the element coupling clutch decouples the first element, the second element, and the third element from each other,
   the transmission being further configured to
      transmit the rotational power from the engine in the first continuously variable transmission mode, when the second element fixing clutch and the first path disconnect clutch are both in the released state and the element coupling clutch is in the engaged state,
      transmit the rotational power from the engine in the second continuously variable transmission mode, when the second element fixing clutch and the element coupling clutch are both in the released state and the first path disconnect clutch is in the engaged state, and
      transmit the rotational power from the engine in the direct mode, when the second element fixing clutch and the first path disconnect clutch are both in the engaged state and the element coupling clutch is in the released state.

6. The transmission according to claim 1, wherein
   the first path includes a first shaft member, a second shaft member, and a first path disconnect clutch disposed between the first shaft member and the second shaft member, the first path disconnect clutch disconnects the first shaft member from the second shaft member in a released state, and connects the first shaft member and the second shaft member in an engaged state, the transmission further comprises
- a bypass path connecting the second path to the first rotary shaft or the second rotary shaft not through the planetary gear mechanism; and
- a bypass clutch configured to switch between connection and disconnection of the first rotary shaft or the second rotary shaft and the bypass path, in the first continuously variable transmission mode, the rotational power from the engine is transmitted from the first rotary shaft to the second rotary shaft not through the first path and the planetary gear mechanism but through the second path and the bypass path, and the transmission is further configured to
- transmit the rotational power from the engine in the first continuously variable transmission mode, when the second element fixing clutch and the first path disconnect clutch are both in the released state and the bypass clutch is in the engaged state,
- transmit the rotational power from the engine in the second continuously variable transmission mode, when the second element fixing clutch and the bypass clutch are both in the released state and the first path disconnect clutch is in the engaged state, and
- transmit the rotational power from the engine in the direct mode, when the second element fixing clutch and the first path disconnect clutch are both in the engaged state and the bypass clutch is in the released state.

7. A work vehicle control system including the transmission according to claim 1, the control system further comprising:
- the engine;
- a rotational speed sensor configured to output a signal indicative of an output rotational speed of the transmission; and
- a controller configured to receive a signal from the rotational speed sensor to control the transmission,
- the controller being further configured to switch the transmission between at least two modes of the first continuously variable transmission mode, the second continuously variable transmission mode, and the direct mode according to the output rotational speed of the transmission.

8. A transmission for transmitting rotational power from an engine, the transmission comprising:
- a first rotary shaft;
- a second rotary shaft;
- a first path disposed between the first rotary shaft and the second rotary shaft in a transmission path of the rotational power from the engine;
- a second path including a continuously variable transmission having a motor and a power source to drive the motor, the second path being connected in parallel to the first path;
- a planetary gear mechanism including a first element connected to the first path, a second element connected to the second path, and a third element connected to the first rotary shaft or the second rotary shaft;
- an element coupling clutch configured to be switched between an engaged state in which the element coupling clutch couples any two of the first element, the second element, and the third element and a released state in which the element coupling clutch decouples the first element, the second element, and the third element from each other, the transmission being configured to be switched between at least two modes of a first continuously variable transmission mode, a second continuously variable transmission mode, and a direct mode, by switching the element coupling clutch being switched between the released state and the engaged state, in the first continuously variable transmission mode, the rotational power from the engine being transmitted from the first rotary shaft to the second rotary shaft not through the first path but through the second path, in the second continuously variable transmission mode, the rotational power from the engine being transmitted from the first rotary shaft to the second rotary shaft through both the first path and the second path, and in the direct mode, the rotational power from the engine being transmitted from the first rotary shaft to the second rotary shaft not through the second path but through the first path.

9. The transmission according to claim 8, wherein
the transmission is further configured to
- transmit the rotational power from the engine in the second continuously variable transmission mode, when the element coupling clutch is in the released state, and
- transmit the rotational power from the engine in the direct mode, when the element coupling clutch is in the engaged state.

10. The transmission according to claim 8, wherein
the first path includes a first shaft member, a second shaft member, and a first path disconnect clutch disposed between the first shaft member and the second shaft member, the first path disconnect clutch disconnects the first shaft member from the second shaft member in a released state, and connects the first shaft member and the second shaft member in an engaged state, the transmission further comprises a first element fixing clutch configured to be switched between a released state in which the first element is rotatably released and an engaged state in which the first element is non-rotatably fixed, and the transmission is further configured to
- transmit the rotational power from the engine in the first continuously variable transmission mode, when the element coupling clutch and the first path disconnect clutch are both in the released state and the first element fixing clutch is in the engaged state, or transmit the rotational power from the engine in the first continuously variable transmission mode, when the first element fixing clutch and the first path disconnect clutch are both in the released state and the element coupling clutch is in the engaged state,
- transmit the rotational power from the engine in the second continuously variable transmission mode, when the first element fixing clutch and the element coupling clutch are both in the released state and the first path disconnect clutch is in the engaged state, and
- transmit the rotational power from the engine in the direct mode, when the first path disconnect clutch and the element coupling clutch are both in the engaged state and the first element fixing clutch is in the released state.

11. The transmission according to claim 8, wherein
the first path includes a first shaft member, a second shaft member, and a first path disconnect clutch disposed between the first shaft member and the second shaft member,
the first path disconnect clutch disconnects the first shaft member from the second shaft member in a released state, and connects the first shaft member and the second shaft member in an engaged state, and
the transmission is further configured to
transmit the rotational power from the engine in the first continuously variable transmission mode, when the first path disconnect clutch is in the released state and the element coupling clutch is in the engaged state, and
transmit the rotational power from the engine in the second continuously variable transmission mode, when the element coupling clutch is in the released state and the first path disconnect clutch is the engaged state.

12. The transmission according to claim 11, wherein
the transmission is further configured to transmit the rotational power from the engine in the direct mode, when the first path disconnect clutch and the element coupling clutch are both in the engaged state.

13. The transmission according to claim 8, wherein
the first path includes a first shaft member, a second shaft member, and a first path disconnect clutch disposed between the first shaft member and the second shaft member,
the first path disconnect clutch disconnects the first shaft member from the second shaft member in a released state, and connects the first shaft member and the second shaft member in an engaged state,
the transmission further comprises
a bypass path that connects the second path to the first rotary shaft or the second rotary shaft not through the planetary gear mechanism; and
a bypass clutch configured to switch between connection and disconnection of the first rotary shaft or the second rotary shaft and the bypass path,
in the first continuously variable transmission mode, the rotational power from the engine is transmitted from the first rotary shaft to the second rotary shaft not through the first path and the planetary gear mechanism but through the second path and the bypass path, and
the transmission is further configured to
transmit the rotational power from the engine in the first continuously variable transmission mode, when the element coupling clutch and the first path disconnect clutch are both in the released state and the bypass clutch is in the engaged state,
transmit the rotational power from the engine in the second continuously variable transmission mode, when the element coupling clutch and the bypass clutch are both in the released state and the first path disconnect clutch is in the engaged state, and
transmit the rotational power from the engine in the direct mode, when the element coupling clutch and the first path disconnect clutch are both in the engaged state and the bypass clutch is in the released state.

14. The transmission according to claim 8, wherein
the first path includes a first shaft member, a second shaft member, and a first path disconnect clutch disposed between the first shaft member and the second shaft member,
the first path disconnect clutch disconnects the first shaft member from the second shaft member in a released state, and connects the first shaft member and the second shaft member in an engaged state,
the transmission further comprises
a bypass path that connects the second path to the first rotary shaft or the second rotary shaft not through the planetary gear mechanism; and
a bypass clutch configured to switch between connection and disconnection of the first rotary shaft or the second rotary shaft and the bypass path,
in the first continuously variable transmission mode, the rotational power from the engine is transmitted from the first rotary shaft to the second rotary shaft not through the first path but through the second path and the planetary gear mechanism, and
the transmission is further configured to
transmit the rotational power from the engine in the first continuously variable transmission mode, when the bypass clutch and the first path disconnect clutch are both in the released state and the element coupling clutch is in the engaged state,
transmit the rotational power from the engine in the second continuously variable transmission mode, when the element coupling clutch and the bypass clutch are both in the released state and the first path disconnect clutch is in the engaged state, and
transmit the rotational power from the engine in the direct mode, when the element coupling clutch and the first path disconnect clutch are both in the engaged state and the bypass clutch is in the released state.

15. The transmission according to claim 14, further comprising:
a bypass path connecting the second path to the first rotary shaft or the second rotary shaft not through the planetary gear mechanism; and
a bypass clutch configured to switch between connection and disconnection of the first rotary shaft or the second rotary shaft and the bypass path,
in the first continuously variable transmission mode, the rotational power from the engine being transmitted from the first rotary shaft to the second rotary shaft not through the first path and the continuously variable transmission but through the second path and the bypass path, and
the transmission being further configured to
transmit the rotational power from the engine in the first continuously variable transmission mode, when the first path disconnect clutch is in the released state and the bypass clutch is in the engaged state, and
transmit the rotational power from the engine in the second continuously variable transmission mode, when the first path disconnect clutch is in the engaged state and the bypass clutch is in the released state.

16. The transmission according to claim 14, further comprising:
a direct path connecting the first rotary shaft to the second rotary shaft not through the first path, the second path, and the planetary gear mechanism; and
a direct clutch configured to switch between connection and disconnection of the first rotary shaft or the second rotary shaft and the direct path,
the transmission being further configured to
transmit the rotational power from the engine in the first continuously variable transmission mode, when the first path disconnect clutch and the direct clutch are both in the released state, transmit the rotational power from the engine in the second continuously variable transmission mode, when the first path disconnect clutch is in the engaged state and the direct clutch is in the released state, and transmit the rotational power from the engine in the direct mode, when the direct clutch is in the engaged state.

17. The transmission according to claim 16, further comprising:

a first element fixing clutch configured to be switched between a released state in which the first element is rotatably released and an engaged state in which the first element is non-rotatably fixed, the transmission being further configured to transmit the rotational power from the engine in the first continuously variable transmission mode, when the first path disconnect clutch and the direct clutch are both in the released state and the first element fixing clutch is in the engaged state, transmit the rotational power from the engine in the second continuously variable transmission mode, when the first path disconnect clutch is in the engaged state and the direct clutch and the first element fixing clutch are both in the released state, and transmit the rotational power from the engine in the direct mode, when the first element fixing clutch or the first path disconnect clutch is in the released state and the direct clutch is in the engaged state.

18. The transmission according to claim 16, further comprising:

an element coupling clutch configured to be switched between an engaged state in which the element coupling clutch couples any two of the first element, the second element, and the third element and a released state in which the element coupling clutch decouples the first element, the second element, and the third element from each other, the transmission being further configured to transmit the rotational power from the engine in the first continuously variable transmission mode, when the first path disconnect clutch and the direct clutch are both in the released state and the element coupling clutch is in the engaged state, transmit the rotational power from the engine in the second continuously variable transmission mode, when the first path disconnect clutch is in the engaged state and the direct clutch and the element coupling clutch are both in the released state, and transmit the rotational power from the engine in the direct mode, when the element coupling clutch or the first path disconnect clutch is in the released state and the direct clutch is in the engaged state.

19. The transmission according to claim 16, further comprising:

a bypass path connecting the second path to the first rotary shaft or the second rotary shaft not through the planetary gear mechanism; and a bypass clutch configured to switch between connection and disconnection of the first rotary shaft or the second rotary shaft and the bypass path, in the first continuously variable transmission mode, the rotational power from the engine being transmitted from the first rotary shaft to the second rotary shaft not through the first path and the planetary gear mechanism but through the second path and the bypass path, and the transmission being configured to transmit the rotational power from the engine in the first continuously variable transmission mode, when the first path disconnect clutch and the direct clutch are both in the released state and the bypass clutch is in the engaged state, transmit the rotational power from the engine in the second continuously variable transmission mode, when the first path disconnect clutch is in the engaged state and the direct clutch and the bypass clutch are both in the released state, and transmit the rotational power from the engine in the direct mode, when the bypass clutch or the first path disconnect clutch is in the released state and the direct clutch is in the engaged state.

20. A transmission for transmitting rotational power from an engine, the transmission comprising:

a first rotary shaft;

a second rotary shaft;

a first path disposed between the first rotary shaft and the second rotary shaft in a transmission path of the rotational power from the engine;

a second path that including a continuously variable transmission having a motor and a power source to drive the motor, the second path being connected in parallel to the first path; and a planetary gear mechanism including a first element connected to the first path, a second element connected to the second path, and a third element connected to the first rotary shaft or the second rotary shaft, the first path including a first shaft member, a second shaft member, and a first path disconnect clutch disposed between the first shaft member and the second shaft member, the first path disconnect clutch disconnecting the first shaft member from the second shaft member in a released state, and connects the first shaft member and the second shaft member in an engaged state, the transmission being configured to be switched between at least two modes of a first continuously variable transmission mode, a second continuously variable transmission mode, and a direct mode, by the first path disconnect clutch being switched between the released state and the engaged state, in the first continuously variable transmission mode, the rotational power from the engine being transmitted from the first rotary shaft to the second rotary shaft not through the first path but through the second path, in the second continuously variable transmission mode, the rotational power from the engine being transmitted from the first rotary shaft to the second rotary shaft through both the first path and the second path, and in the direct mode, the rotational power from the engine being transmitted from the first rotary shaft to the second rotary shaft not through the second path but through the first path.

21. The transmission according to claim 20, wherein the transmission is further configured to transmit the rotational power from the engine in the first continuously variable transmission mode, when the first path disconnect clutch is in the released state, and transmit the rotational power from the engine in the second continuously variable transmission mode, when the first path disconnect clutch is in the engaged state.

22. The transmission according to claim 20, further comprising:
a first element fixing clutch configured to be switched between a released state in which the first element is rotatably released and an engaged state in which the first element is non-rotatably fixed,
the transmission being further configured to
transmit the rotational power from the engine in the first continuously variable transmission mode, when the first path disconnect clutch is in the released state and the first element fixing clutch is in the engaged state, and
transmit the rotational power from the engine in the second continuously variable transmission mode, when the first path disconnect clutch is in the engaged and the first element fixing clutch is in the released state.

* * * * *